US008031919B2

(12) United States Patent
Eskildsen et al.

(10) Patent No.: US 8,031,919 B2
(45) Date of Patent: Oct. 4, 2011

(54) COMPUTERISED CORTEX BOUNDARY EXTRACTION FROM MR IMAGES

(75) Inventors: Simon Fristed Eskildsen, Aalborg (DK); Mark Uldahl, Aalborg Ø (DK); Lasse Riis Østergaard, Vodskov (DK); Anders Prisak, Arhus C (DK)

(73) Assignee: Aalborg Universitet, Aalborg Ø (DK)

(*) Notice: Subject to any disclaimer, the term of this patent is extended or adjusted under 35 U.S.C. 154(b) by 1034 days.

(21) Appl. No.: 11/596,504

(22) PCT Filed: May 13, 2005

(86) PCT No.: PCT/DK2005/000320
§ 371 (c)(1),
(2), (4) Date: Oct. 4, 2007

(87) PCT Pub. No.: WO2005/111931
PCT Pub. Date: Nov. 24, 2005

(65) Prior Publication Data
US 2008/0170791 A1 Jul. 17, 2008

Related U.S. Application Data

(60) Provisional application No. 60/570,493, filed on May 13, 2004.

(30) Foreign Application Priority Data

May 13, 2004 (EP) ..................................... 04011386

(51) Int. Cl.
*G06K 9/00* (2006.01)
(52) U.S. Cl. .............................. 382/128; 378/4; 128/922

(58) Field of Classification Search .................. 382/100, 382/128, 129, 130, 131, 132, 181, 190, 195, 382/199; 128/922; 378/4–27
See application file for complete search history.

(56) References Cited

U.S. PATENT DOCUMENTS 4,710,876 A 12/1987 Cline et al.
4,885,688 A 12/1989 Crawford
(Continued)

OTHER PUBLICATIONS

Kass et al.; *Snakes: Active Contour Models*; International Journal of Computer Vision; 1988; pp. 321-331 (1988) Kluwer Academic Publishers, Boston, obtained through Google search.

(Continued)

*Primary Examiner* — Anand Bhatnagar
(74) *Attorney, Agent, or Firm* — James Creighton Wray

(57) ABSTRACT

Method for processing digital images, such as magnetic resonance images of a brain. The images contain a first object, for example the cerebrum white matter, a second object, for example the cerebral cortex, and a third object, for example the cerebrospinal fluid. The method involves providing a digital dataset representing a deformable curve or surface that in an initial state approximates the boundary between the first object and the second object. Further, a vector force field is provided that for each point on the deformable curve or surface defines a direction from the point approximately towards the second boundary between the second and the third object, and this vector force field is applied for iteratively deforming the deformable curve or surface convergently towards the second boundary. In order to reconstruct a folded structure of the second object, for example the cortex, the vector force field also involves a normal vector field with a vector normal or approximately normal to the deformable curve or surface for each point on the deformable curve or surface.

19 Claims, 12 Drawing Sheets

U.S. PATENT DOCUMENTS

| | | | | |
|---|---|---|---|---|
| 6,535,623 | B1* | 3/2003 | Tannenbaum et al. | 382/128 |
| 6,591,004 | B1* | 7/2003 | VanEssen et al. | 382/154 |
| 6,721,450 | B2* | 4/2004 | Tannenbaum et al. | 382/173 |
| 6,813,373 | B1* | 11/2004 | Suri et al. | 382/128 |
| 7,079,674 | B2* | 7/2006 | Paragios et al. | 382/128 |
| 2003/0142868 | A1* | 7/2003 | Tannenbaum et al. | 382/199 |

OTHER PUBLICATIONS

Cohen et al.; *Finite-Element Methods for Active Contour Models and Balloons for 2-D and 3-D Images*; IEEE Transactions on Pattern Analysis and Machine Intell., vol. 15, No. 11, Nov. 1993, pp. 1131-1147.

MacDonald et al.; *Automated 3-D Extraction of Inner and Outer Surfaces of Cerebral Cortex from MRI*; Neurology, vol. 12, pp. 340-356; 2000; Academic Press.

Dale et al.; *Cortical Surface-Based Analysis*; NeuroImage, vol. 9, pp. 179-194, 1999; Academic Press.

Chenyang Xu et al.; *Reconstruction of the Human Cerebral Cortex from Magnetic Resonance Images*; IEEE Transactions on Medical Imaging, vol. 18, No. 6; Jun. 1999; pp. 467-480.

Xiao Han et al.; *Cortical Surface Reconstruction Using a Topology Preserving Geometric Deformable Model*; IEEE Workshop on Mathematical Models in Biomedical Image Analysis; Kauai, HI; 2001.

Chenyang Xu et al.; *Gradient Vector Flow: A New External Force for Snakes*; Proc. of IEEE Conference on Computer Vision Pattern Recognition (CVPR); pp. 66-71; 1997.

Jasjit Suri et al.; *Computer Vision and Pattern Recognition Techniques for 2-D and 3-D MR Cerebral Cortical Segmentation*; Pattern Analysis & Applications, vol. 5, pp. 46-76; Springer-Verlag Limited.

Moller, Tomas; *A Fast Triangle-Triangle Intersection Test*; Journal of Graphics Tools; vol. 2, pp. 25-30; 1997.

Xiao Han et al.; *Topology Correction in Brain Cortex Segmentation Using a Multiscale, Graph-based Algorithm*; IEEE Transactions on Medical Imaging; vol. XX, 2002; pp.1-13.

McInerney et al.; *Toplogy Adaptive Deformable Surfaces for Medical Image Volume Segmentation*; IEEE Transactions on Medical Imaging; vol. 18, No. 10, Oct. 1999; pp. 840-850.

Fischl et al.; *Automated Manifold Surgery: Constructing Geometricall Accurate and Topolgically Correct Models of the Human Cerebral Cortex*; IEEE Transactions on Medical Imaging, vol. 20, No. 1, Jan. 2001; pp. 70-80.

MacDonald, J. David; *A Method for Identifying Geometrically simple Surfaces from Three Dimensional Images*; PhD Thesis, McGill University, Montreal, Canada 1997.

Williams et al.; *A Fast Algorithm for Active Contours*; Third International Conference on Computer Vision; IEEE, 1990; pp. 592-595.

Chenyang Xu; *Deformable Models with Application to Human Cerebral Cortex Reconstruction from Magnetic Resonance Images*; Ph.D Dissertation; John Hopkins University, Baltimore, MD 1999.

Stytz et al.; *Three Dimensional Medical Imaging: Algorithms and Computer Systems*; ACM Computing Surveys, vol. 23, No. 4; Dec. 1991; pp. 422-499.

Davatzikos et al.; *Using a deformable Surface Model to Obtain a Shape Representation of the Cortex*; IEEE Transactions on Medical Imaging, vol. 15, No. 6, Dec. 1996; pp. 783-795.

McInerney et al.; *T-snakes: Topology adaptive snakes*, Medical Image Analysis, vol. 4, 2000, Elsevier Science B.V.; pp. 73-91.

\* cited by examiner

FIG. 1a
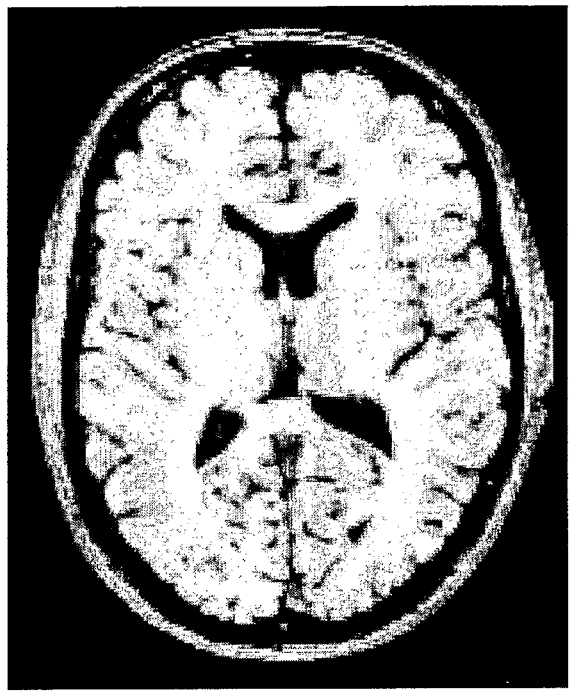
FIG. 1b
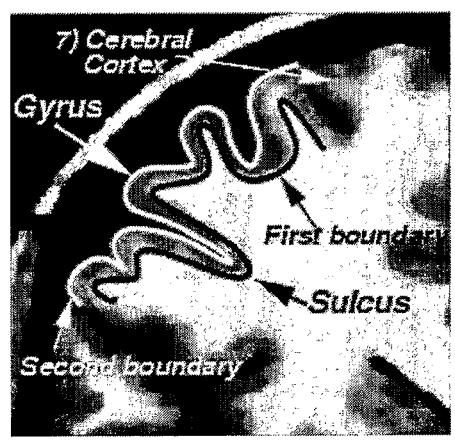
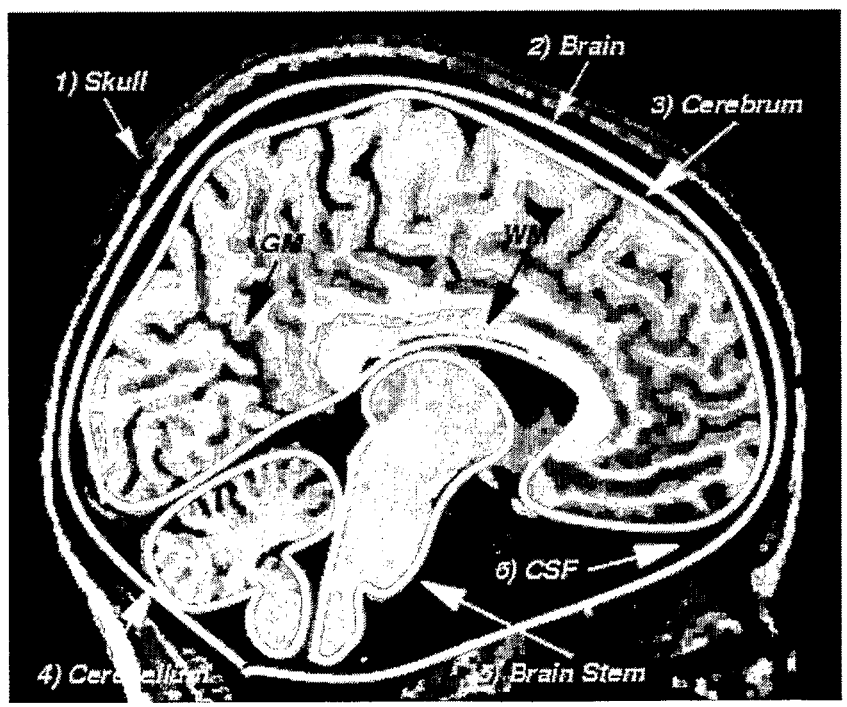
FIG. 1c

FIG. 12a
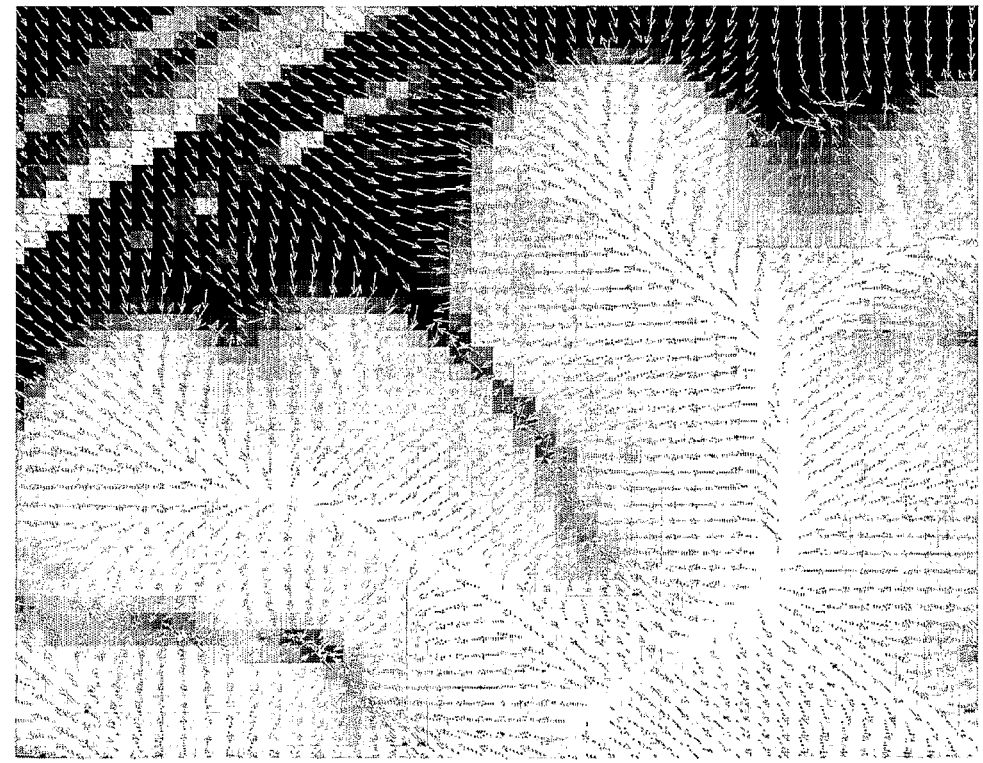
FIG. 12b

COMPUTERISED CORTEX BOUNDARY EXTRACTION FROM MR IMAGES

This application claims the benefit of U.S. Application Ser. No. 60/570,493, European Application No. 04011386.2 filed May 13, 2004 and PCT/DK2005/000320 filed May 13, 2005, which are hereby incorporated by reference in their entirety.

FIELD OF THE INVENTION

The present invention relates to a method for boundary extraction in images, for example MR images of a brain.

BACKGROUND OF THE INVENTION

Several neurodegenerative diseases, such as Alzheimer's disease, cause atrophy of the cerebral cortex. Measurements of cerebral cortical thickness and volume can be used in the quantification and location of atrophy. While it is possible to measure the thickness of the cerebral cortex manually from magnetic resonance (MR) images, partial volume effects (PVE), orthogonality problems, large amounts of manual labour and operator bias makes it difficult to make measurements on large patient populations. Automatic quantification and localisation of atrophy is a highly desirable goal, as it allows studying early changes and track disease progression on large populations. A first step in achieving this goal is to develop robust and accurate methods for automatically measuring cortical thickness and volume.

The cortical thickness can be measured as the distance between the inner and outer boundaries of the cerebral cortex. Current research aims at automatically extracting these boundaries by means of rather complicated computer routines from digital data-sets of MR images. Typical MR images show the surrounding skull, inside which the brain, comprising the cerebrum, the cerebellum and the brain stem, is embedded in a cerebrospinal fluid (CSF). In the so-called T1-weighted (the T1 modality is described in "Principles of Medical Imaging" by K. Kirk Shung, Michael B. Smith and Benjamin Tsui, ISBN: 0-12-640970-6) MR images, CSF appears dark in the images in contrast to the white matter (WM) of the cerebrum. The outer layer of the cerebrum is the cerebral cortex, which in the T1-weighted images appears as grey matter (GM). The majority of known methods either extract the cortical boundaries directly from the image data, or they iteratively fit deformable surfaces to the boundaries from some initial configuration. The first approach typically segment CSF voxels, GM voxels, and the WM voxels in the volumetric MR image data based on the image intensities, and then extracts the boundary surfaces using an iso-surfacing algorithm like the marching cubes algorithm by William E. Lorensen and Harvey E. Cline, "Marching cubes: A high resolution 3D surface construction algorithm," *Computer Graphics*, vol. 21, no. 4, pp. 163-169, 1987 U.S. Pat. No. 4,710,876 and U.S. Pat. No. 4,885,688. Voxel-based segmentation methods are often fast, reliable and well-suited for volumetric measurements. However, with the voxel-based methods, which most often rely on low-level image information, it is difficult to compensate for PVEs, and to obtain a sub-voxel accuracy.

Another approach, called the deformable surface approach, is typically a variation upon the active contour method due to Michael Kass, Andrew Witkin, and Demetri Terzopoulos, "Snakes: Active contour models," *International Journal of Computer Vision*, 1988, where a curve, guided by an energy function, is fitted to the boundary of interest. The energy function consists of internal energies, which describe intrinsic properties of the curve and external energies which express external forces, such as the image gradient, which act upon the curve. Laurent D. Cohen and Isaac Cohen generalised the active contour framework to three dimensions, where a surface is fitted instead of a curve in "Finite-element methods for active contour models and balloons for 2D and 3D images," IEEE Transactions on Pattern Analysis and Machine Intelligence, 1993.

The deformable surface approach makes it possible to compensate for PVEs to a higher degree than the voxel/iso-surface approach and in addition allows for obtaining sub-voxel accuracy, as surface deformation relies on both low-level as well as high-level information. The combination of high- and low-level information enables delineation of the boundary in areas where image edges are obscured or missing. Such areas are almost always present in MR images of the human cerebral cortex due to the convolved nature of the cortex and MR image related artifacts. Opposite banks of tight sulci may meet inside the sulcal folds and appear as connected in MR images due to undersampling and artifacts. The main difficulty in cortical segmentation lies in correctly penetrating such sulci and reaching their fundus, which is a very important aspect as the true cortical thickness could be over- or underestimated otherwise. David MacDonald, Noor Kabani, David Avis, and Alan C. Evans addressed this problem by deforming the outer and inner surface simultaneously under the influence of an intersurface distance constraint, which keeps the surfaces within some predefined distance, in "Automated 3-D extraction of inner and outer surfaces of cerebral cortex from MRI," published in *NeuroImage, vol.* 12, pp. 340-356, 2000. The constraint drags the outer surface toward the fundus of sulci, although they might appear closed, and constraints prevent the surfaces from intersecting each other and themselves. However, there exist a bias between the chosen predefined distance and the measured cortical thickness leading to uncertainties in the final measurements.

A different approach to modeling the cortex without a distance constraint is taken by Anders M. Dale, Bruce Fischl, and Martin I. Sereno, "Cortical surface-based analysis i: Segmentation and surface reconstruction," *NeuroImage*, vol. 9, pp. 179-194, 1999. In this approach, a surface, represented by a discrete mesh, is first fitted to the inner boundary of the cortex, and extended towards the outer boundary of the cortex in the direction of the surface normals. Such an approach places the surface at approximately the midpoints of tight sulci when no CSF is evident in between the sulcal banks, provided no self-intersections are allowed. The inner boundary follows the concavities and convexities of the outer boundary, but does in contrast to the outer boundary not appear as closed in tight sulci and is thus more easily segmented. Surface normals, approximated from a discrete mesh, may be inaccurate, as they can be perturbed by noise in the surface, and the surface normals may not always point in the correct direction of the second boundary. As the direction of the displacement of the deforming surface is only based on the surface normals, modelling of non-existing features may erroneously arise, when the surface is displaced over larger distances. A single mis-leading normal may for example cause modelling of a non-existent sulcus on the crown of a gyrus.

Chenyang Xu, Dzung L. Pham, Maryam E. Rettmann, Daphne N. Yu, and Jerry L. Prince, uses another approach in "Reconstruction of the human cerebral cortex from magnetic resonance images," published in *IEEE Transactions on Medical Imaging*, vol. 18, no. 6, pp. 467-480, 1999. They introduced an interesting alternative with a "Generalised Gradient Vector Flow" (GGVF) force, which provides vectors pointing toward the nearest image edge. This force is then used for extending the inner surface towards the central layer of the cortex. Xu et al. noted that their approach could be tailored to segmenting the CSF/GM boundary instead of the central layer. However, their approach does not impose self-intersection constraints, which is necessary when segmenting the outer boundary. This method is not automatic but requires intervention and correction by an operator which makes this method time consuming and not suited for large amounts of data-sets, for example when data-sets from a large number of people have to be evaluated statistically.

Another approach has been published by Xiao Han, Chenyang Xu, Duygu Tosun, and Jerry L. Prince, "Cortical Surface Reconstruction Using a Topology Preserving Deformable Model," IEEE Workshop on mathematical models in biomedical image analysis, Kauai Hi. 2001. This method is an automatic method to reconstruct the GM/WM, central and pial surfaces of the cerebral cortex from MR images. This method models sulci by removing voxels along their medial axes in the GM membership volume, and has therefore not the ability to model tight sulci with a subvoxel precision. The openings of the sulci are stopped at 1 mm distance from the fundus. The drawbacks are therefore that the distance between the sulcal banks are minimum 1 voxel even though the sulus is completely closed, and the cortical thickness at the fundus of tight sulcal folds are always 1 mm, which is presumed to be a lower bound of the cortical thickness, hence this method is also biased to a predefined distance.

U.S. Pat. No. 6,591,004 by VanEssen assigned to Washington University discloses a method called SUREFIT for reconstructing surfaces. This method is not fully automatic as the topology correction requires manual intervention. This makes the method tedious for large numbers of data-sets, for example when data-sets from a large number of subjects have to be evaluated statistically. Furthermore, this method has the disadvantage of not preventing self-intersections of the calculated surfaces, which especially makes modelling of sulci unreliable.

In the dissertation "Deformable models with application to human cerebreal cortex reconstruction from magnetic resonance images" by Chengyang Xu, published at Johns Hopkins University, Baltimore, Md., retrievable from Internet httl://iacl.ecejhu.edu/pubs/chenyang_xu_thesis.pdf, a model is disclosed for reconstruction of sulci. Fort this, a linear combination of a normal vector field with a gradient vector field is employed. The normal vector field is set identical to zero in the grey matter of the brain, as discussed on page 77 in this reference, such that the gradient vector field is the only external force.

Even though a number of methods are known according to the overview above, the methods still lack a reliable method for modeling the sulci, especially the bottom of the sulci, on the outer boundary of the cortex. However, especially the modeling of the sulci is important, if accurate measurements of the cortical thickness are to be achieved.

DESCRIPTION/SUMMARY OF THE INVENTION

It is therefore the objective of the invention to provide an improved, robust, and accurate method for automatically modelling the boundary of a folded structure in a digital image. Especially, the purpose is a more accurate modelling of the folds even if the folds are not distinct in the image. Furthermore, it is an objective of the invention to provide an improved, robust, and accurate method for automatically calculating outer boundary, and optionally also the inner boundary, of the cortex on the basis of datasets representing MR images.

This objective is achieved with a method according to the invention as explained in the following for digitally processing n-dimensional images, with n>1, in the form of a digital data array. The images, for example MR images of a brain, contain a first object, for example the cerebrum WM, a second object, for example the cerebral cortex, and a third object, for example the CSF, where the second object is sheet like and has a first boundary with the first object along a first side of the second object and a second boundary with the third object along a second side, typically opposite side, of the second object. The three objects are at least faintly distinguishable in the image represented by the digital data array. As one step, the method according to the invention comprises providing a digital dataset representing a deformable curve or surface which in an initial state is contained in the first or second object, for example a curve or surface that approximates the boundary between the first object and the second object. In the case that the images are two-dimensional, n=2, the boundary is given by a curve, whereas in the case of higher dimensions, where n>2, for example three dimensional or even higher dimensions, the boundary is given by a surface of dimension n>2. As another step, the method according to the invention comprises providing a vector force field that for points, for example every point, on the deformable curve or surface defines a direction from the point approximately towards the second boundary and applying this vector force field on the digital dataset for iteratively deforming the deformable curve or surface convergent towards the second boundary. Furthermore, the vector force field comprises a normal vector field with local vectors normal or approximately normal to the deformable curve or surface.

The normal vector field is especially useful for reconstruction of the second boundary if the second object is a sheet-like folded structure, where the second boundary of the folded structure does not appear discernable in the image. The normal vector field may comprise vectors approximately normal, as a definite normality is not necessary and in many cases not possible due to uncertainties during the calculation.

In comparison to the methods according to prior art, the method according to the invention has a substantial advantage for folded structures, such as the cortex, when the normal vector field is applied. If the sheet like structure is at some locations very tightly folded, the opposite walls of a fold may be so tight together that the fold in the image appears as having no boundary, hence no image information is available in order to aid the delineation of the boundary. Starting with an initial curve/surface in the first or second object, for example a curve/surface that in a fold-embracing manner resembles the first boundary, and using a vector force field, for example comprising a gradient vector field, but not a normal vector field for the iterative deformation of this curve/surface towards the second boundary may result in a poor approximation of the second boundary not extending very far into the tight fold, simply because a gradient vector field during the iteration pulls the deformed curve/surface out of the fold towards the third object. In contrast to prior art, the invention makes use of a normal vector field in combination with another vector field, for example a gradient vector field. This other vector field relates to the external energies and not only to intrinsic properties of the surface. When using the normal vector field, that part of the initial curve/surface that embraces the fold will by the normal vector field be pulled towards the midline between the opposite walls of the fold such that the final curve/surface for the second boundary will stay inside the fold, thus resembling a good approximation of the true depth of the fold, even though it is not discernable from the image as such, because the fold is so tightly packed.

Thus, the invention differs from the method as disclosed in the above mentioned Xu-dissertation in that a normal vector field exists in the second object, in other words, the normal vector field is not substituted by zero in the grey matter (second object). This has a distinct advantage as explained in the following. In Xu's method, the reconstruction of sulci tends to pull the curve or surface away from the bottom of the sulci towards the outer boundary of the grey matter, resulting in badly reconstructed sulci that are not as deep as in reality. In contrast, according to the invention, the normal vector field preserves the steep side walls of the sulci and leads therefore to a more reliable reconstruction. In fact, according to the invention, the normal vector field may in the second object locally attain a value of zero during the deformation of the curve. However, the normal vector field is not generally zero in the second object. Thus, the requirements may be that the normal vector field is weighted by a weighting function that is different from zero for a majority of points in the second object. This means that the normal vector field actually contributes to the vector force field, for example as part of a linear combination, where the weighting function is different from zero. The weighting function can in certain cases be a function with high complexity, but can in simple cases just be a numerical number factor, for example a factor of 1.

Another remarkable difference between the method as disclosed in Xu's dissertation and the invention should be noted. According to the invention, the deformable curve or surface is deformed convergently towards the second boundary, which implies that the curve converges at the boundary, for example the outer boundary of the grey matter. In contrast, in Xu's method, the outer surface of the grey matter is not found but a central layer inside the grey matter is used, which implies an uncertainty in the calculated thickness of the cortex. In contrast thereto, the approximate finding of the boundary of the grey matter, in accordance to the invention, yields a high degree of certainty for the calculated cortical thickness and volume.

In addition, the method may include that the vector force field comprises a linear combination of a weighted normal vector field with local vectors normal or approximately normal to the deformable curve or surface and other weighted vector fields, each of the vector fields being independent of the normal vector field. That the other vector field or fields are independent from the normal vector field implies that the linear combination is not identical to the trivial case where an arbitrary vector field which has been split up into a normal vector field and a tangential vector field. For example, the normal vector field and other vector fields may have a weighting function that is different from zero for a majority of points in the second object.

As will be more apparent in the following, the method according to the invention has been employed in an apparatus that was programmed to perform the method as described above. In a concrete embodiment, the invention has been accomplished by a computer program comprising program instructions for causing a computer to perform the steps of the method. The method, where the curve/surface is deformed in steps of smaller dimension than the size of a single pixel/voxel in the digitised images, requires a repeating procedure with a large number of iterations making it suitable for automatic computer calculation.

The method according to the invention has been invented for reconstruction of the cortex in MR image data sets. Such reconstruction is useful for measurements of the thickness, volume, curvature and area of the cortex which is of interest for scientific purposes as well as for clinical purposes in order to have an intermediate result for assessing the progress of certain diseases, and investigate markers for neurodegenerative diseases. Furthermore, the surfaces representing the cortical boundaries may benefit surgical planning and simulation. However, the method appears also useful in other areas of application. Such an area is geology, where the method may be used for calculating geological layer formation under ground, where the data may be of seismic nature. Also, the method may be employed in investigations concerning underground stores of gas, oil, minerals, or likewise. A further application is polymer science, where especially folded structures may be reconstructed where the structures are only hardly distinguishable due to bad contrast in the images, for example infrared images, X-ray images or ultra sound images. In a more abstract view, the method can also be used in multidimensional datasets with dimension higher than n=3, if the other requirements for application of the method are fulfilled.

It should be noted that it is not necessary that the objects for the reconstruction are isomorphous to a sphere. Also, the invention may be used for investigations of an images structure that corresponds to a slice through a multi-sheet structure with open ends. In this case, care has to be taken for the mathematical situation at the end points of the sheets, for example by linking the end points to the respective borders between the layers. In cases where the curve or surface is open, constraints or conditions can be applied to the edge vertices in order to control and possible fixate the extent of the curve or surface. This could be relevant if working on part of an anatomical structure, e.g. a part of the cerebral cortex. Also when applying the method to the areas mentioned above, e.g. seismic data, this could be relevant.

For the gradient vector field, it is possible to apply the generalised gradient vector flow, GGVF, as described in Chenyang Xu, Dzung L. Pham, Maryam E. Rettmann, Daphne N. Yu, and Jerry L. Prince: "Reconstruction of the human cerebral cortex from magnetic resonance images," published in *IEEE Transactions on Medical Imaging*, vol. 18, no. 6, pp. 467-480, 1999 or as disclosed in C. Xu and J. L. Prince, "Gradient Vector Flow: A new external force for snakes", in Proc. IEEE Conf. Computer Vision Pattern Recognition (CVPR), 1997, pp. 66-71.

Alternatively, a different gradient vector force field may be applied, where this gradient is calculated by convolving the gradient image with a Gaussian kernel, and thereby extending the gradient information. The direction vectors are then obtained by calculating the first order partial derivative of the extended gradient. The extension of the gradient information can be done in a multi-scale fashion, so that the information of the sharp image edge is not lost. However, by calculating a vector field in this way, a direction vector is not guaranteed to be present at all positions in the image, only within the "capture range" of the Gaussian kernel.

Any curve/surface or image edge which approximates the second boundary or at least approximates the part of the second boundary that can be discerned in the image may be used as the definition of the edge, towards which the gradient vector field points. Having a defined edge approximating the second boundary, the gradient vector field can be calculated in different ways by diffusing the edge information to a part of or the entire volume or by calculating shortest distances from the curve/surface to the edge, and let the vectors point in these directions.

The vector force field may comprise a gradient vector field based on image intensities or image colours in the digital data array. Such image intensities or image colours may be adjusted by filtering prior to calculation of the gradient vector field.

In a further embodiment, the method comprises providing a step size for the iterative deformation of the curve/surface, where the step size is calculated as the length of the resulting vector of the vector force field scaled by a dynamic factor depending on the distance to the second boundary. The dynamic factor may be dependent on the evidence of the second boundary, where this evidence may be based on the image gradient or a classification of the image intensities. Thus, the step size decreases in the vicinity of the second boundary. This is one of the ingredients that ensures convergence of the calculation.

In a further embodiment, the method comprises determining a local direction for the iterative deformation of the curve/surface, where the direction is dependent on local properties of the curve/surface and possible classifications of image data. This may for example be the positive or negative direction of the curve/surface normal depending on the classification of the image data. The classification of the image data determines whether the local part of the curve/surface is positioned in the second object or third object, and thereby controls the positive or negative direction of the normal vector. In cases where the curve/surface is discrete and piecewise linear, the curve/surface normals may only be approximated at junctions between line segments. This may for example be an average direction of the normals of the adjacent line segments. Other definitions of the curve/surface normal at a junction between line segments may be used as long as the resulting vector is an approximation to the curve/surface normal.

The normal vector field and the gradient vector field may be comprised by the vector force field in a linear combination, for example where the two fields are not weighted identically, or where the weighting is differently, for example depending on the location on the curve/surface. The latter may be the case, if the method comprises calculating the local curvature of the curve or surface in a geodesic neighbourhood of a point on the curve or surface, and in dependency of the local curvature, weighting the influence of the gradient vector field against the normal vector field on the force vector field at the point. For example, the curvature in the bottom of sulci is very different from the curvature on the walls of the sulci or at the top, and this can be used for the weighting of the vector fields. Other local properties could be used to obtain this weighting of the influence of the gradient vector field and the influence of the normal vector field. These include properties derived from image intensities, distance maps, atlas information, etc.

Advantageously, the method according to the invention comprises the use of a fuzzy or probabilistic segmentation algorithm for weighted segmentation of the data in the digital data array into at least two classes, where one class is associated with the third object and another class is associated with the second object, wherein the method further comprises basing the gradient vector field on a fuzzy membership or probabilities of the data in the digital data array. The fuzzy or probabilistic segmentation may also comprise further classes, and classes may be combined in different ways. A useful segmentation may be achieved with the fuzzy c-means algorithm as described in Jasjit S. Suri, Sameer Singh, and Laura Reden, "Computer vision and pattern recognition techniques for 2-D and 3-D MR cerebral cortical segmentation(part I): A state-of-the-art review," Pattern Analysis and Applications, vol. 5, pp. 46-76, 2002 and in Lasse Riis Østergaard and Ole Vilhelm Larsen, "Applying voting to segmentation of mr images," Advances in Pattern Recognition, Lecture Notes in Computer Science, vol. 1451, pp. 795-804, 1998. However, other data segmentation algorithms, also described in the above mentioned review by Suri et al., may be applied, for example probabilistic algorithms such as the Expectation Maximization algorithm reported by Wells III W M, Grimson W E L, Kikinis R, Jolesz F A, "Adaptive segmentation of MRI data", IEEE Trans Medical Imaging 1992; 15(4): 429442; or the Markov Random Fields reported by Kapur T., "Model based three dimensional Medical Image Segmentation" in the PhD Thesis, Artificial Intelligence Laboratory, Massachusetts Institute of Technology, Cambridge, Mass., May 1999; or the Bayes Classifier reported in Geman S, Geman D, "Stochastic relaxation, Gibbs distribution and the Bayesian restoration of images", IEEE Trans Pattern Analysis and Machine Intelligence 1984; 6(6): 721-741.

Alternatively, a binary classification may be employed. However, in contrast to a binary classification, the fuzzy or probabilistic algorithms have the advantage that more information is retained. As several objects may span a single voxel, the exact location of the border between the objects must be interpolated. The binary segmentation assigns every voxel to a single object, and thus discards information which can be used for obtaining an accurate sub-voxel delineation of an edge through interpolation.

Depending on the domain of the application, additional forces can be incorporated in the vector force field. For example, to obtain smooth characteristics of a curve/surface, forces being or approximating the first and second order derivative of the curve/surface can be used. Other forces based on the intrinsic properties of the curve/surface can be used dependent on the application domain.

Additional or alternative forces/energies may be used in connection with the vector force field. An example may be a force/energy based on an intersurface distance, as described in David MacDonald, Noor Kabani, David Avis, and Alan C. Evans in "Automated 3-D extraction of inner and outer surfaces of cerebral cortex from MRI," published in *NeuroImage*, vol. 12, pp. 340-356, 2000 combined with information about surface curvatures, such that this force/energy only has influence in the bottom of narrow sulci.

In the case where the boundaries of the second object, for example a folded structure, have been reconstructed, the data obtained may be used for measurements of the local and mean thickness of the second object and for the volume of it. Though not containing a complete scheme for a diagnosis of a disease, the invention, when applied for the measurements of the thickness of the cortex in MR images, however, may be used to provide one of the intermediate results that may be used in the understanding of which factors are influencing neurodegenerative diseases.

In a further embodiment, the method comprises providing constraints for the deformation of the curve or surface for preventing self-intersection. Self-intersection may disturb the calculation in a pronounced way leading to distortions and useless results. In a specific application of the method of the invention, namely for evaluating MR images of brains, this feature will be discussed in more detail in the detailed description.

In a further embodiment, the method comprises performing non-topology-altering remeshing of the deformable curve or surface in connection with the deformation.

In order to achieve a reliable dataset with the potential of sub-pixel or sub-voxel precision, the dataset for the deformable surface is polygonised into a discrete mesh, typically using a triangulation. The polygonised deformable surface may contain handles or holes as artefacts. Such artefacts may then be removed by a topology correction.

In a further embodiment, the curve or surface in the initial state is provided by providing the deformable curve or surface in a pre-initial state, for example in a pre-initial state with the same Euler characteristic as assumed for the second boundary in order to assure correct topology, providing a pre-initial vector force field comprising a normal vector field, and applying the pre-initial vector force field on the digital dataset for iteratively deforming the deformable curve or surface from a pre-initial state convergently towards the first boundary. A part of the invention concerns the finding of the second boundary. In order to achieve this, a number of starting points can be chosen, for example a curve or surface approximating the first boundary which is deformed towards the second boundary. However, in order to achieve this initial state for the deformable curve or surface, a procedure may be applied to a pre-initial curve that is deformed until it approximates the first boundary. For this, a procedure may be applied with steps largely as described in the foregoing for finding the second boundary. The finding of the initial state of the deformable curve or surface is in a specific embodiment explained in the detailed description in connection with MR images of brain. However, the method is of general character and may be applied likewise also for other image data sets than for MR images of brain.

If the third object is surrounded by a fourth object, for example the skull surrounding of cerebrospinal fluid, it may be advantageous to remove the fourth object in order that this object does not influence the calculation. For this simplification, the method comprises identifying a fourth object in the image, for example the skull, on the opposite side of the third object, for example the cerebrospinal fluid, relative to the second object, for example the grey matter of the cortex, and providing a curve or surface contained in the third object and digitally removing the fourth object from the digital data set. This will be elaborated in more detail in a specific embodiment in the detailed description.

SHORT DESCRIPTION OF THE DRAWINGS

The invention will be explained in more detail with reference to the drawing, where FIG. 1 shows images from datasets of MR scans;

Figure 4:
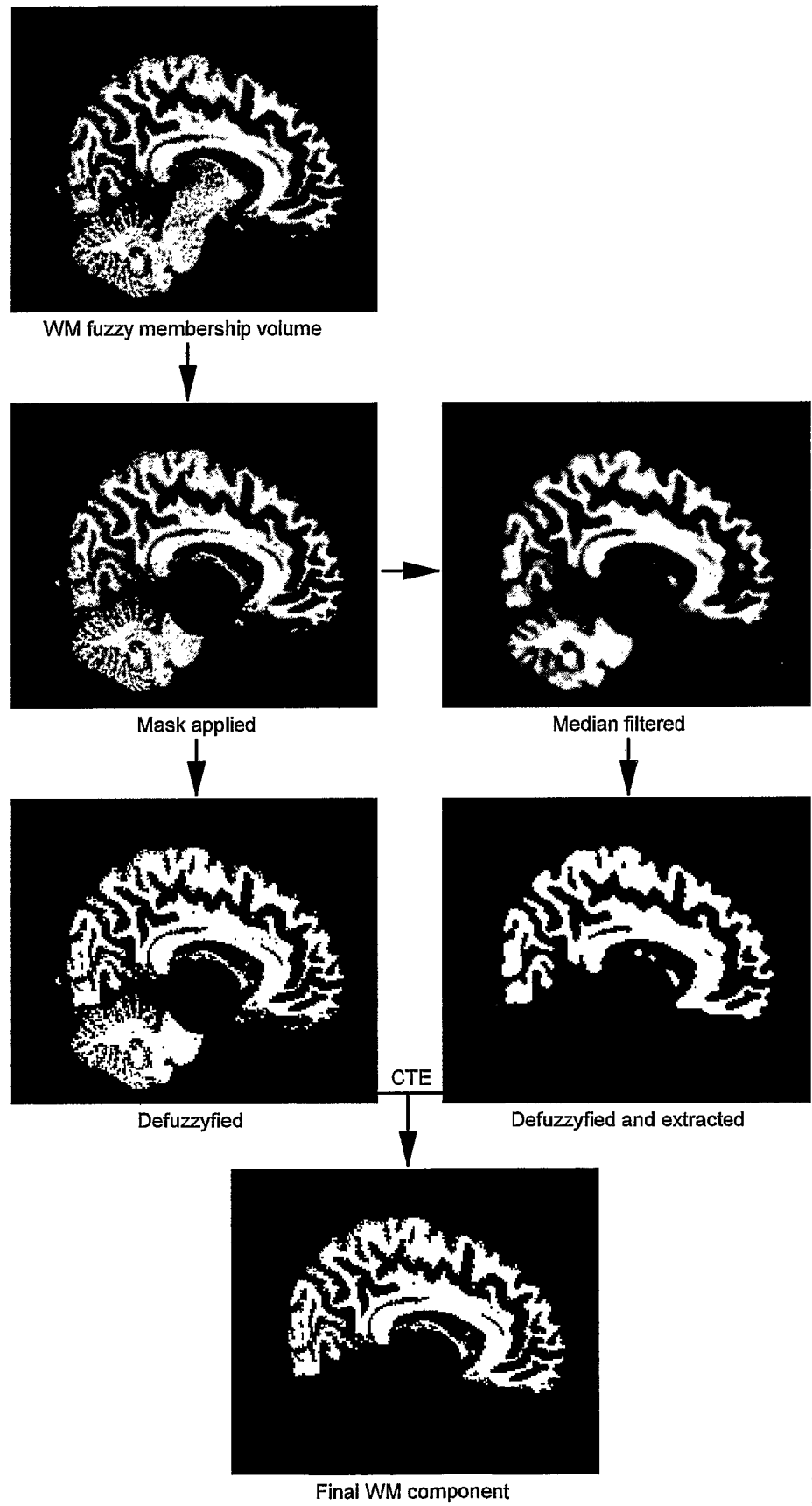
Figure 5:
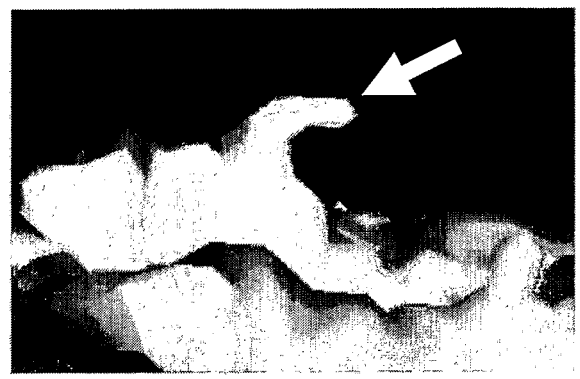
Figure 6:
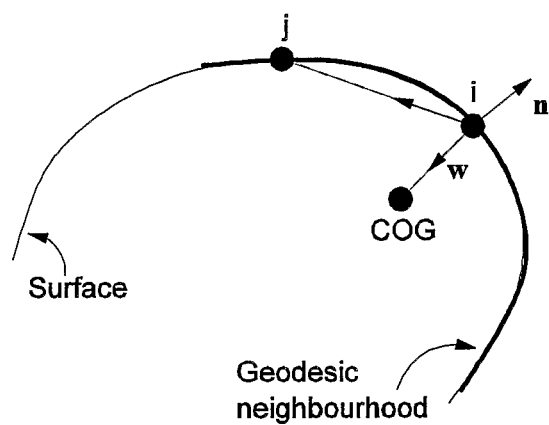
Figure 7:
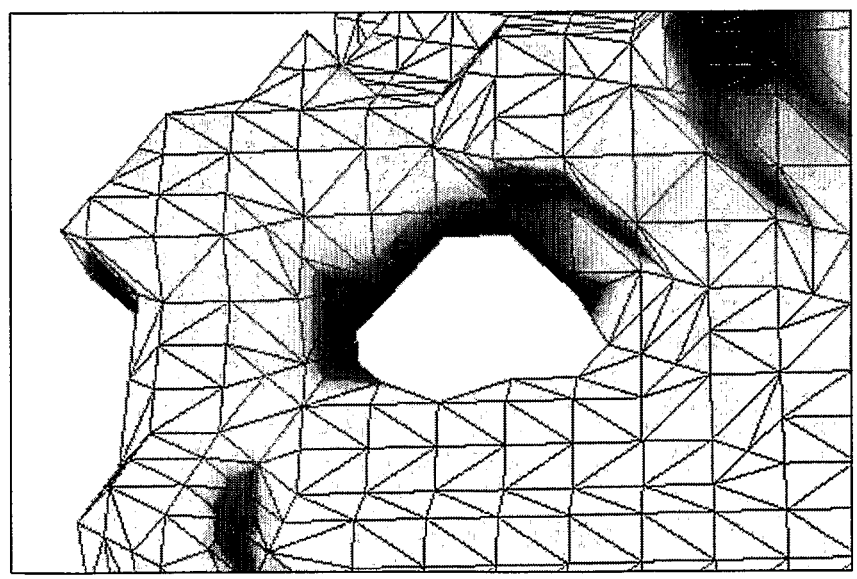
Figure 8:
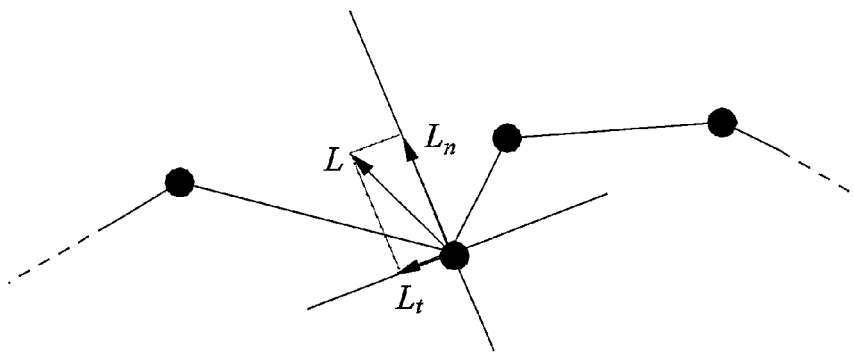
Figure 10A:
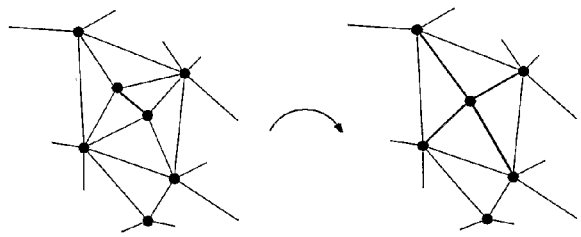
Figure 10B:
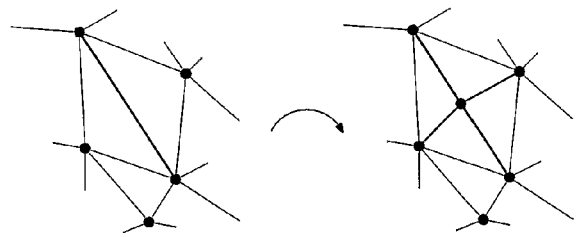
Figure 13:
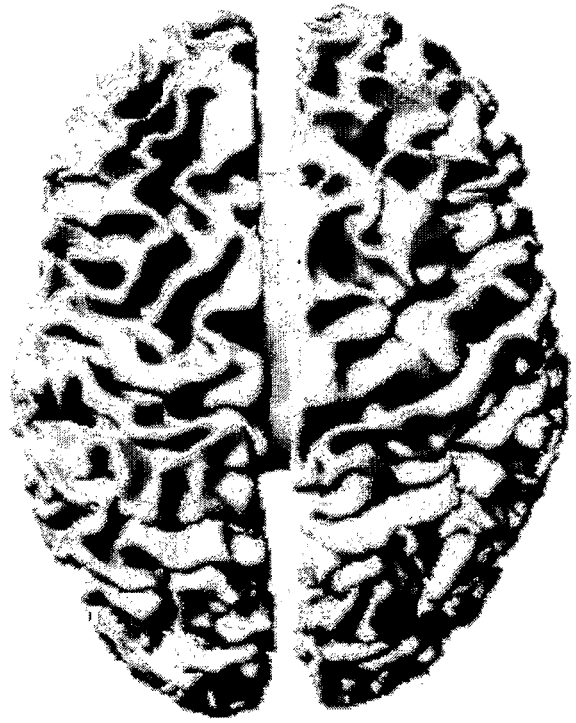
Figure 13:

FIG. 4 illustrates a flow diagram of the method for extracting the WM voxels in the cerebrum. The brain stem is almost disconnected by masking out a region at the superior part of the brain stem. The remaining voxels that connect the cerebrum with the cerebellum and brain stem are removed by median filtering the masked volume. The volume is defuzzyfied and the cerebrum is extracted. The details of the WM component in the cerebrum are restored using CTE;

FIG. 5 illustrates a local extreme on the initial inner surface;

FIG. 6 illustrates how the curvature is estimated including the geodesic neighbourhood $N_g(i)$, COG=Center of gravity;

FIG. 7 show a part of a modeled cerebrum surface with a handle as an artifact;

FIG. 8 illustrates a decomposition of the Laplacian and squared Laplacian vectors into a tangential component and a normal component;

FIG. 9 illustrates weighting functions; a) the weighting function $f$ used to scale the internal forces based on the surface curvature, b) the weighting function g used by the inflation force to scale the unit normal based on the membership difference, and c) the weighting function h that the gradient is mapped by;

FIG. 10 illustrates the removal of edges shorter than $T_{min}$ in FIG. 10a, and splitting of edges longer than $T_{max}$ in FIG. 10b;

FIG. 11 illustrates an example of how the inflation force enables modeling of narrow sulci with no CSF evident. The thick, dashed line indicates the deformable surface, which approaches the GM/CSF boundary from the WM/GM boundary. As the deformable surface is pushed in the direction of the local surface normals, it will eventually meet itself inside deep narrow sulci;

FIG. 12 illustrates in comparison a gradient vector field on the original data (a) and a gradient vector field based on fuzzy membership data (b);

FIG. 13 illustrates a surface of the inner cortical boundary reconstructed from MRI data using the developed method.

Figure 14:
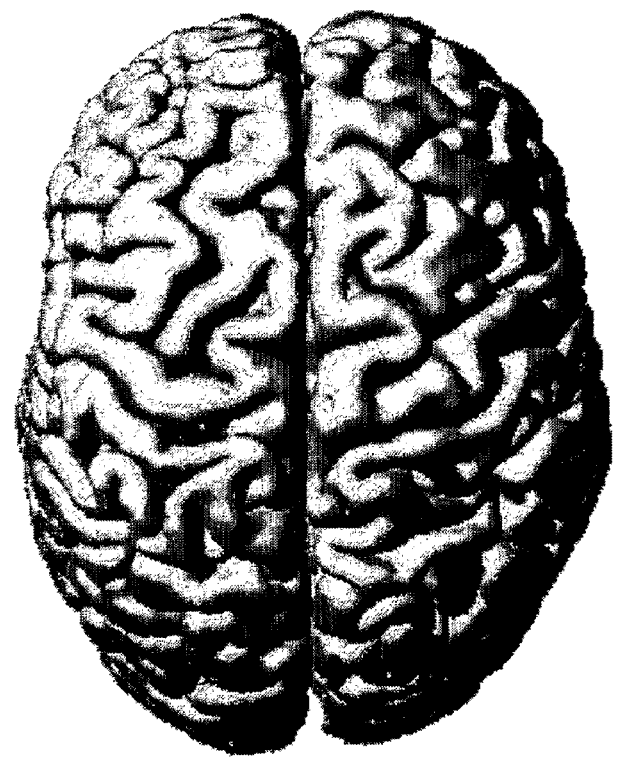
Figure 14:
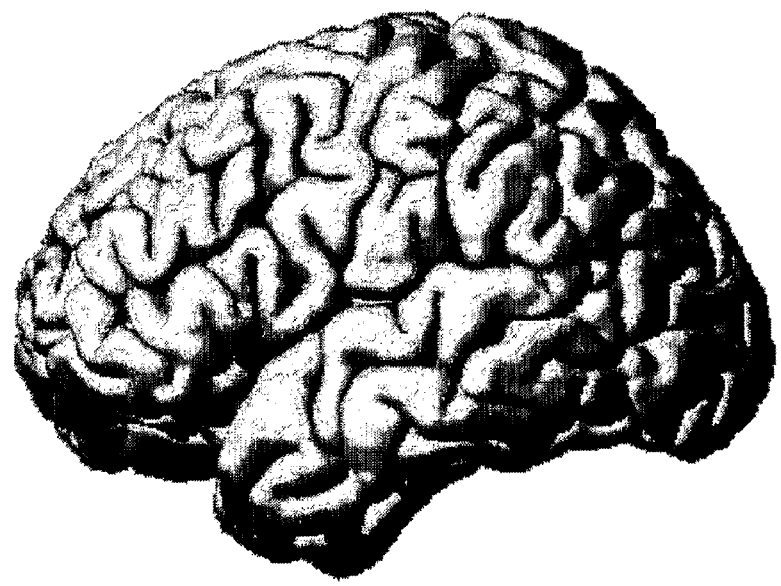

FIG. 14 illustrates a surface of the outer cortical boundary reconstructed from MRI data using the developed method.

Figure 15:
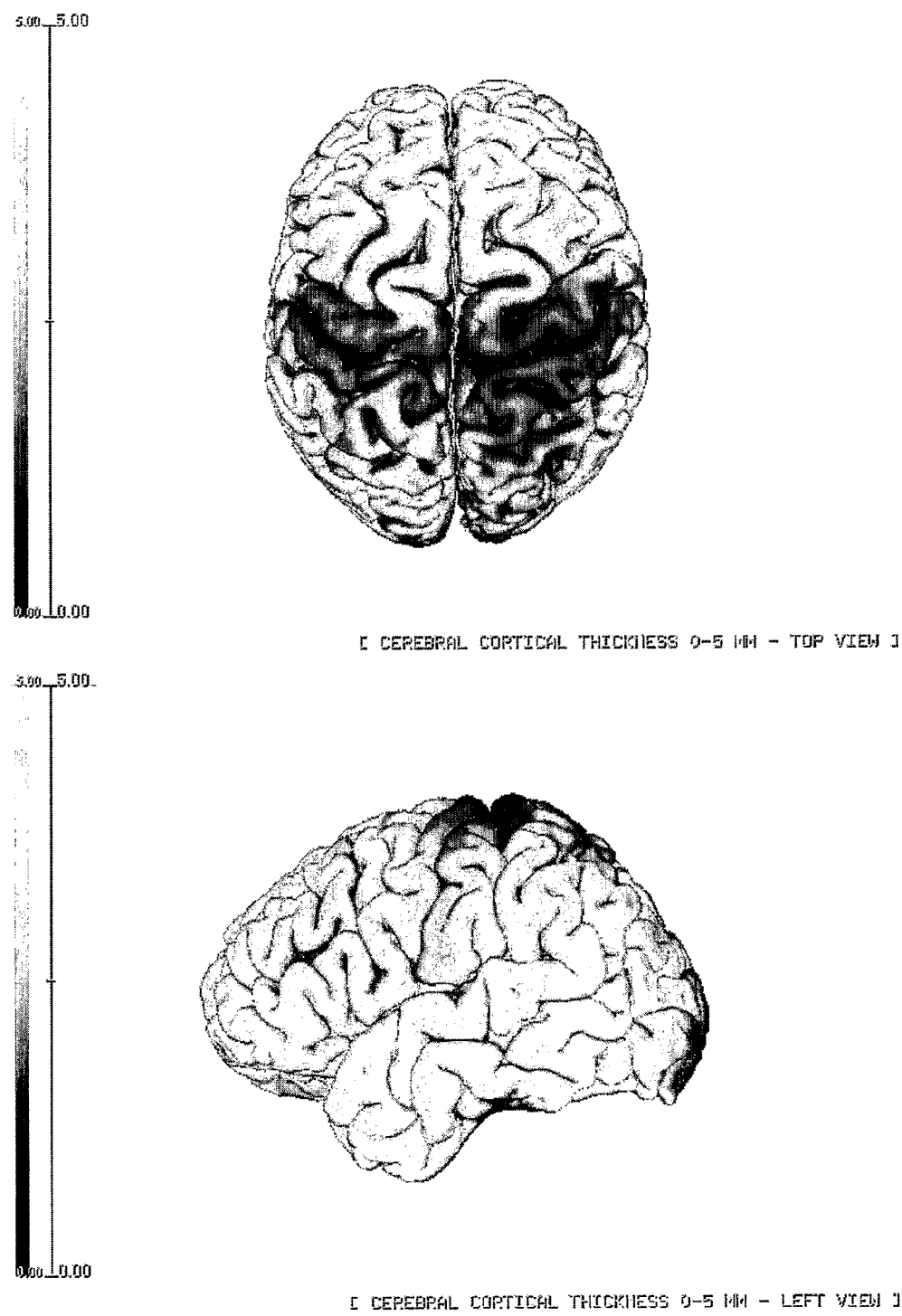

FIG. 15 examples of thickness measurements shown on the extracted outer surface.

Figure 16:
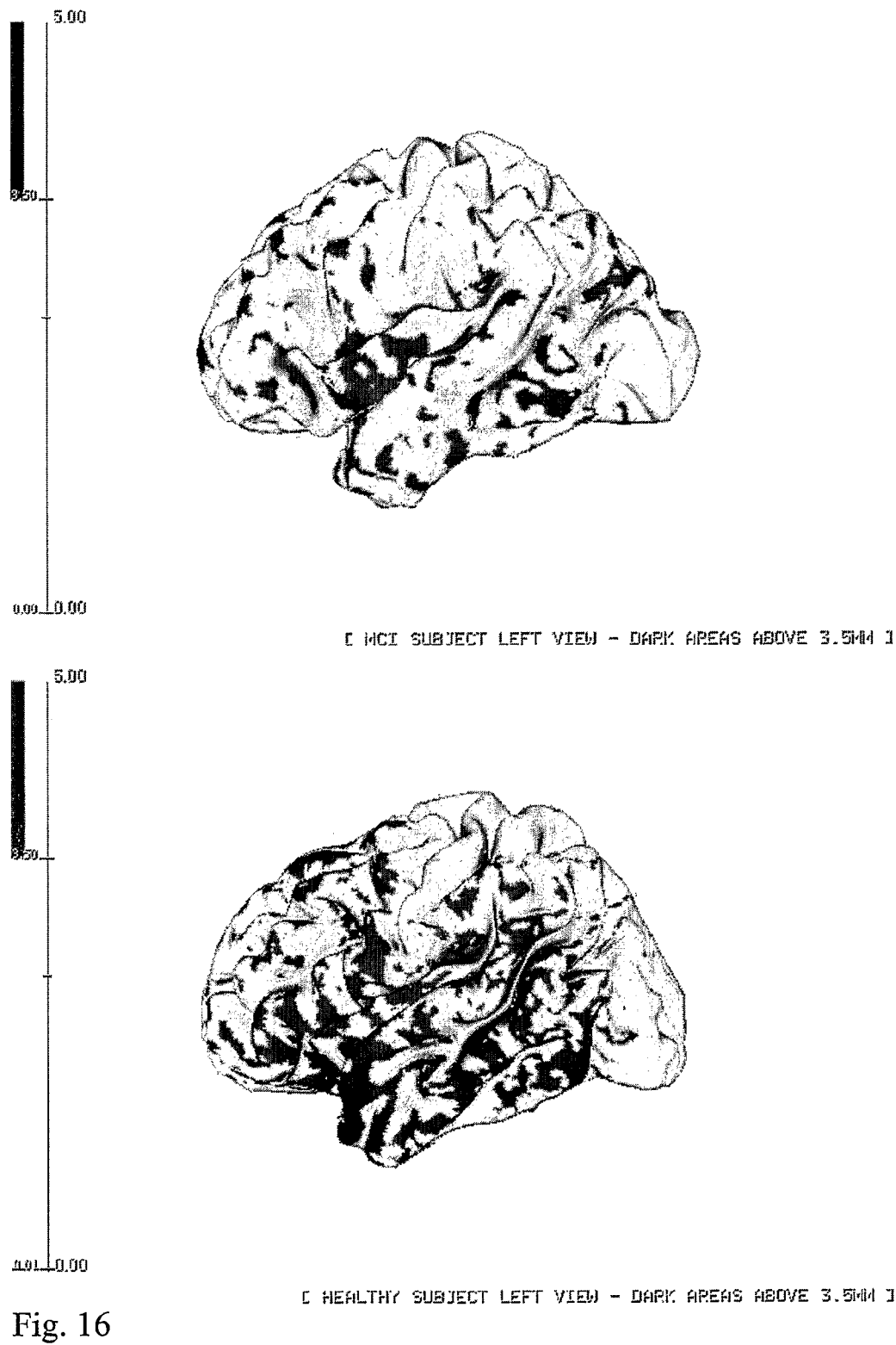

FIG. 16 illustrates the cortical thickness of a healthy subject (bottom) and demented subject (top) shown on partially flattened outer surfaces.

DETAILED DESCRIPTION/BEST MODE

The method according to the invention can be used as a general method for extraction of contours from images, for example from grey scale images with object contours having blurry and/or faint borderlines. However, as an example, the method according to the invention will be explained in detail for the extraction of the cerebral cortex from sets of magnetic resonance (MR) images. It is assumed that images have been taken with MR as slices of a three dimensional volume containing the brain of a human being. The applied set of images in the form of digitised data will be termed MR volume in the following.

FIG. 1 illustrates dataset from an MR volume in the form of digitised images that show slices of a brain taken at different angles (transversal and sagittal) of a human being. The images show with highlight of roughly approximated boundaries the surrounding skull 1, inside which the brain 2, comprising the cerebrum 3, the cerebellum 4 and the brain stem 5, is embedded in a cerebrospinal fluid (CSF) 6, which appears dark in the images in contrast to the white matter (WM) of the cerebrum 3. The outer layer 7 of the cerebrum 3 is the cerebral cortex, which in the images appears as grey matter (GM). In the following, the terms CSF, GM, and WM will be used in line with the cerebrospinal fluid, the cortex and the cerebrum, respectively.

It is the task to find an optimum approximation in the data for the boundaries of the GM. The problem is that the exact boundaries between the GM and the WM and between the GM and the CSF cannot be found directly from the images, as the boundaries are not explicitly visible in the images themselves. This is so, because the images contain noise in the data, related to the MRI equipment and thermal noise from the scanned object. Furthermore, the structures are blurred due to partial volume effects (PVE) and/or movement of the object during the recording of the images. The task is therefore to extract all possible information from the images and combine it with the best models available for such kind of data in order to reduce artificial effects in the images as much as possible. Especially, it is the purpose to approximate the gyri and sulci as illustrated in FIG. 1b and FIG. 11 of the cortex as correct as possible. This will be explained in the following in more detail.

Figure 2:
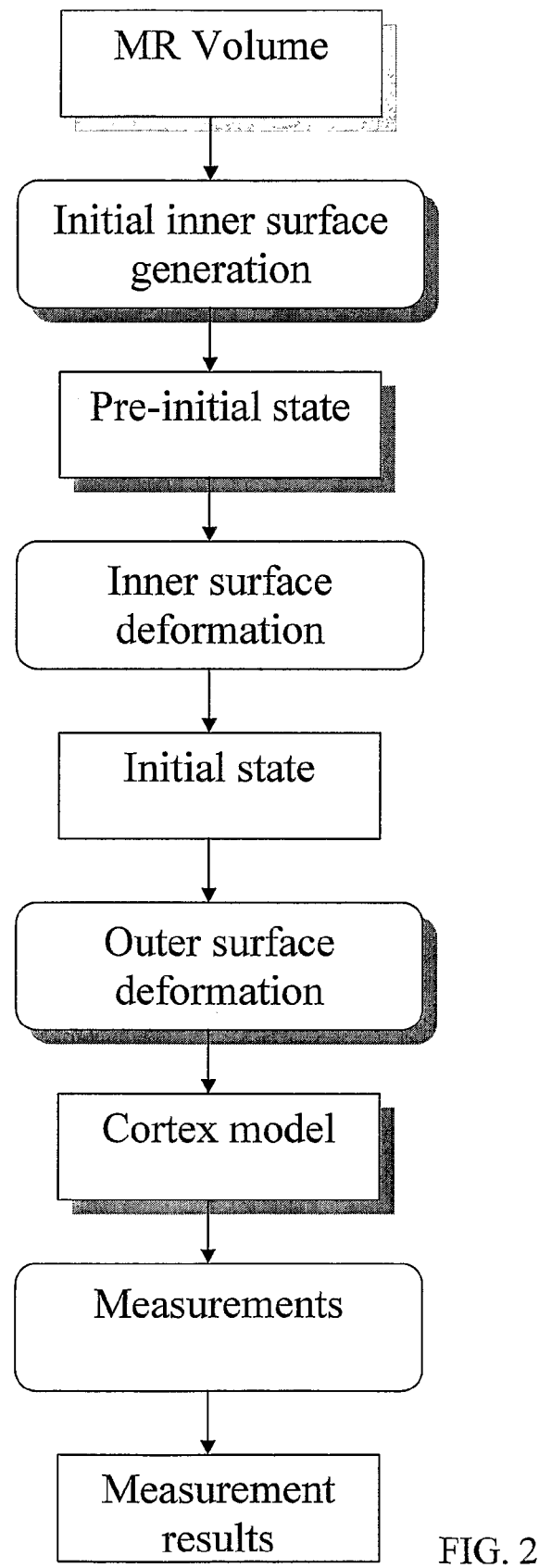
FIG. 2 is a flow diagram of the method according to the invention, where rounded boxes indicate processing steps and squared boxes indicate data.

The general strategy for finding the inner and outer boundary of the cerebral cortex is illustrated in FIG. 2. An MR volume is used as input data for the computerised analysis. From this MR volume, digital data are generated representing a surface that is an initial estimate of the inner cortex boundary. In the next step, this initial inner surface is deformed to fit with a high accuracy the inner boundary of the cortex in the MR volume. The deformed inner surface is then used as an initial guess for the calculation of the outer surface of the cortex. By expanding the initial inner surface, the surface is in an iterative procedure practically pushed toward the apparent outer boundary of the cortex, to which the surface can be approximated as an outer surface of the cortex. After this, it is possible to measure the cortical thickness at arbitrary locations on the cortex.

The following explains the procedures and techniques in each step of the method parted up into three main procedures, namely A) the generation of the initial inner surface of the cortex as a starting point for B) the adjustment of the surface to the inner boundary, and C) the deformation of this surface towards the outer boundary of the cortex until a good approximation of the outer boundary is reached.

A. Initial Inner Surface Generation

From the digital MR volume, a calculated surface of the inner boundary of the cerebral cortex is generated in two steps. First, the WM component of the cerebrum is extracted. Second, a surface tessellation using the WM component of the cerebrum is performed.

A.1. Cerebrum White Matter Extraction

Initially, the digital data in the raw MR volume is preprocessed to reduce the tissue inhomogeneity artifacts and the data are registered into a common reference space. For this purpose an inhomogeneity removal and registration procedure is used, which is described in D. Louis Collins, Alex P. Zijdenbos, Tomas Paus, and Alan C. Evans, "Use of registration for cohort studies," Tech. Rep., Montreal Neurological Institute, McGill University, 2000. The main points in this method are reduction of image artifacts due to inhomogeneities in the MR coil and alignment of the MR scans to a common reference space.

Next, the brain, comprising cerebrum, cerebellum and brain stem, is extracted from the data using a simple algorithm, which inflates a triangulated sphere (discrete mesh), placed inside the brain, until the mesh contains the entire cerebrum without containing non-brain tissue. The polygonising process with triangles, also called tessellation, implies an approximation of the surface of the object by connected surface triangles. Such a polygonal model simplifies the further calculations, because the surface is explicitly given with vertices and their interrelations, which makes it possible to calculate properties of the surface. The most difficult tasks in the extraction of the cerebrum are to determine the initial placement and size of the tessellated sphere, and to determine a proper intensity threshold for the boundary separating brain tissue from non-brain tissue. The initial centre of the tessellated sphere is found by calculating the mean position of all voxels with a higher than average intensity. The size of the tessellated sphere is found as half the average distance from the center of the sphere to the most distant high intensity voxels along the three principal axes. Taking only half the average distance is a simple measure to ensure the sphere being initially placed within the brain. All voxels placed within the sphere is classified as either GM, WM or CSF using a fuzzy c-means classifier as described in Jasjit S. Suri, Sameer Singh, and Laura Reden, "Computer vision and pattern recognition techniques for 2-D and 3-D MR cerebral cortical segmentation (part I): A state-of-the-art review," Pattern Analysis and Applications, vol. 5, pp. 46-76, 2002.

Figure 3A:
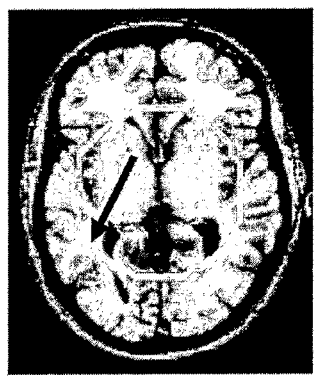
FIG. 3 illustrates intersection of the MR data with an example of the initial tessellated sphere (a), inflated surface (b) and masked volume (c)
Figure 3B:
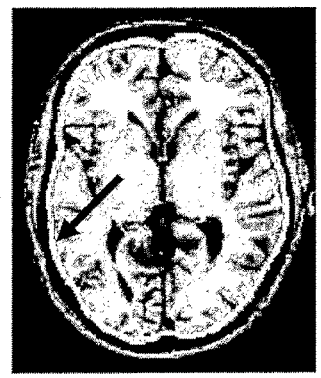
Figure 3C:
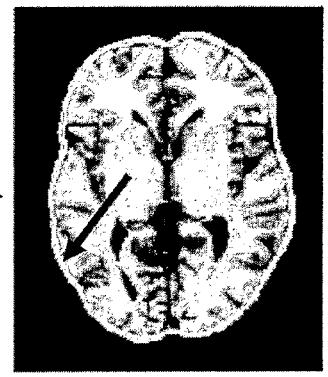

The centre of the CSF cluster (i.e. the centre of the cluster with the lowest intensities) is chosen as the threshold for the border separating brain tissue from non-brain tissue. The tessellated sphere is inflated towards this boundary by iteratively moving the vertices of its surface in the directions of the surface normals, until they coincide with the boundary. The surface is kept smooth by internal forces, described in section C below, and self-intersections are prevented by means of a fast triangle-triangle intersection test, which is described in more detail in Tomas Möller, "A fast triangle-triangle intersection test," Journal of Graphics Tools, vol. 2, pp. 25-30, 1997. FIG. 3a shows an example of the initial coarse tessellated sphere and FIG. 3b the resulting inflated surface. All surfaces are indicated by a contour and a pointing arrow in the images. As a final step in the brain extraction, all voxels exterior to the inflated surface are mathematically removed, leaving a volume, containing only the cerebrum, cerebellum and brain stem as illustrated in FIG. 3c.

To identify the WM voxels in the MR volume, a fuzzy c-means algorithm is applied to the volume containing the extracted brain. The fuzzy c-means algorithm is described in Jasjit S. Suri, Sameer Singh, and Laura Reden, "Computer vision and pattern recognition techniques for 2-D and 3-D MR cerebral cortical segmentation(part I): A state-of-the-art review," Pattern Analysis and Applications, vol. 5, pp. 46-76, 2002 and in Lasse Riis Østergaard and Ole Vilhelm Larsen, "Applying voting to segmentation of mr images," Advances in Pattern Recognition, Lecture Notes in Computer Science, vol. 1451, pp. 795-804, 1998. Three classes for the fuzzy c-means algorithm are used, namely WM, GM, CSF. The output of the fuzzy c-means algorithm is three volumes with the membership values for each class.

The WM membership volume is used in the further procedure of generating the initial surface. To find the WM inside the cerebrum, the cerebrum is separated from the cerebellum and brain stem, and a segmentation of the cerebrum WM can be done by extracting the largest connected WM component in the volume.

To separate the cerebrum from the cerebellum and brain stem, a region at the superior part of the brain stem is masked out, thus disconnecting most of the brain stem from the cerebrum. The procedure is illustrated in FIG. 4. This can be done automatically since the MR volumes representing brains are registered to a common reference space. After the mask has been applied, the WM membership volume is median filtered to remove the remaining voxels that connect the cerebellum and brain stem to the cerebrum. After the WM membership volume has been median filtered, the volume is defuzzified using simple thresholding. The median filtering, however, causes details to be removed from the WM. All the details of the WM are needed in order to create a good initial estimate of the inner boundary of the cortex. Therefore, conditional topological expansion (CTE) is used to recover the lost details of the WM. CTE is described in Xiao Han, Chenyang Xu, Ulisses Braga-Neto, and Jerry L. Prince, "Topology correction in brain cortex segmentation using a multiscale, graph-based algorithm," IEEE Transactions on Medical Imaging, vol. 21, no. 2, pp. 109-121, 2002. By using the median filtered and defuzzified WM membership volume as body component, and the removed voxels due to median filtering as residue component in the CTE, it is possible to restore the details of the WM without reconnecting the cerebellum and brain stem to the cerebrum.

A.2 Generating the Surface as an Initial Approximation for the First Boundary The inner boundary of the cortex can be approximated by the surface of the extracted WM component of the cerebrum. A tessellation of the surface of the extracted WM component is performed in order to present the surface as a mesh of triangles. This is done using the Marching Cubes algorithm as described in William E. Lorensen and Harvey E. Cline, "Marching cubes: A high resolution 3D surface construction algorithm," Computer Graphics, vol. 21, no. 4, pp. 163-169, 1987. The Marching Cubes algorithm is used as it is fast, and simple to implement, but any algorithm, capable of extracting a polygonal surface from voxelated data, may be used.

The extracted WM component is highly detailed, and the result of the tessellation is a surface with a lot of local extremes. This is illustrated by an example in FIG. 5 showing a narrow extremity extending from the surface. However, the desired surface of the WM/GM boundary is not a surface with many small extremes but a smooth anatomical correct surface. As the local extremes of the initial surface are difficult to smooth during the deformation, the local extremes are removed in voxel data before generating the initial surface.

To remove the local extremes, the volume containing the binary WM component is median filtered. However, there is a risk of removing thin parts of the WM that are necessary to maintain in order to capture the entire WM/GM boundary. To avoid this, the median filter is made location conditional, meaning that the filter is only allowed to add voxels on top of gyri and remove voxels at bottom of sulci. This way the WM component is kept present at all extremities of the WM/GM boundary, while the small local extremes are removed. However, this only works if it can be determined whether a location on the WM component is on a gyrus or in a sulcus (for an illustration of a gyrus and a sulcus, see FIG. 1b. To determine this, the curvature of the WM component is estimated using a tessellated surface of the WM component. The curvature is estimated at each vertex of the surface using the expression:

$$\rho(i) = \begin{cases} \sigma(i), & \text{if } \vec{w}\cdot\vec{n}(i) \le 0 \\ -\sigma(i), & \text{otherwise,} \end{cases} \quad (1)$$

where $$\sigma(i) = \frac{1}{m}\sum_{j\in N_g(i)} \pi - 2\cos^{-1}\left(\frac{\vec{x}(j)-\vec{x}(i)}{\|\vec{x}(j)-\vec{x}(i)\|}\cdot\vec{w}\right)$$

where $N_g(i)$ is a geodesic neighbourhood around vertex i as illustrated in FIG. 6, w is a unit vector pointing from i towards the centre of gravity (COG) of $N_g(i)$, n(i) is the normal vector at i, and m is the number of vertices in $N_g(i)$. If a proper geodesic neighbourhood is chosen, the values of ρ(i) can be used as a direct measure of the surface curvature, where values of zero are found in flat areas, positive values in convex areas and negative values in concave areas. Having these values it can be determined whether a location on the WM component is on the top of a gyrus or at the bottom of a sulcus. Other local properties than the curvature may be estimated from the WM component in order to indicate the presence of convex or concave morphology (gyri and sulci). These include properties derived from image intensities, distance maps, atlas information, etc.

The surface generated from the WM component is not guaranteed to be topological equivalent to a sphere, which has the Euler characteristic as the characteristic assumed for the outer cortical boundary. Topology correction of the surface is therefore necessary to remove topological inconsistencies in the surface, for example handles as illustrated in FIG. 7. To remove such handles, a method has been applied, which is described in Xiao Han, Chenyang Xu, Ulisses Braga-Neto, and Jerry L. Prince, "Topology correction in brain cortex segmentation using a multiscale, graph-based algorithm," IEEE Transactions on Medical Imaging, vol. 21, no. 2, pp. 109-121, 2002. This method removes topological inconsistencies, such as handles, from an object.

The resulting surface, which is a first approximation for the WM/GM boundary (first boundary), acts as a starting point for the following surface deformation.

B. Inner Surface Deformation

The initial inner surface is close to the WM/GM boundary in the images of the MR volume. However, as the surface is generated directly from voxel based data, the surface has an angular appearance (staircase artifacts) not resembling correct anatomical structures. The purpose of the surface deformation is to smooth the surface and adjust it to an approximately correct tissue boundary using both low level and high level information. The term low level information in this context is used for the information given in the image data. The term high level information is used for anatomical properties such as smoothness, i.e. information which relates to a priori knowledge.

The surface is deformed by iteratively moving each vertex in a direction and with a distance defined by a vector. As the displacement mathematically is similar to a force acting on an object, the term force is used as a general term for such vector functions. A force is a vector function determined by parameters and dependencies, for example dependent on the image data, the intrinsic properties of the surface, or both. Forces dependent only on the surface properties are called internal forces, whereas forces dependent on the image data are called external forces. For every vertex, the forces are calculated, and each force results in a vector. The sum of these force vectors provides an update vector by which the vertex is displaced. The vertices of the surface are updated iteratively, and eventually the surface reaches equilibrium.

Both internal and external forces are used to control the behaviour of the deformable surface. Internal forces are applied to keep the vertices well-distributed and achieve a smooth characteristic of the surface. For this purpose a tensile force and a flexural force are used. In analogy to the method disclosed in Tim McInerney and Demetri Terzopoulos, "Topology adaptive deformable surfaces for medical image volume segmentation," IEEE Transactions on Medical Imaging, vol. 18, no. 10, pp. 840-850, 1999, the tensile force is calculated by an approximation of the Laplacian $$\vec{L}(i) = \frac{1}{m}\sum_{j\in N(i)} \vec{x}(j) - \vec{x}(i) \quad (2)$$

where x(i) is the position of vertex i, N(i) are the neighbour vertices to i, x&) are the positions of i's neighbours, and m is the number of vertices in N(i). The flexural force is calculated by an approximation of the squared Laplacian:

$$L^2(i) = \frac{1}{m}\sum_{j\in N(i)} \vec{L}(\vec{x}(j)) - \vec{L}(\vec{x}(i)) \quad (3)$$

Both L and $L^2$ are decomposed into a tangential component and a normal component of the force vector, which is illustrated in FIG. 8. This gives the opportunity to adjust the contractive effect of the internal forces by weighting each component:

$$u_{int} = c_1 L_n + c_2 L_t + c_3 L_n^2 + c_4 L_t^2 \qquad (4)$$

The internal forces have the effect of smoothing and flattening the surface. However, as the WM/GM boundary is highly convolved with both peaked and flat areas, the internal energies have to be relaxed in certain areas of the surface and increased in others. To do this, it is determined, whether a given location on the surface is in an area with high curvature or low curvature of the WM/GM boundary. The initial inner surface is a good approximation of the true WM/GM boundary, as it captures the general convolvedness of the boundary. The initial inner surface is therefore used as an estimate of the WM/GM boundary curvature, and the internal forces are weighted accordingly. The curvature is estimated at each vertex of the initial surface using the expression in (1). In order to suppress noise in the curvature values due to small segmentation errors of the initial surface, the values are Gaussian filtered. Finally, the curvature values are scaled to span the interval [−1; 1], and are in this form used to weight the internal forces $u_{int}$ (4):

$$\hat{u}_{int}(i) = f(\rho(i))u_{int}(i), \qquad (5)$$

where $f$ is a weighting function defined as $$f(x) = 1 - \tfrac{1}{2}\tan(|x|), x \in [-1;1] \qquad (6)$$

Figure 9A:
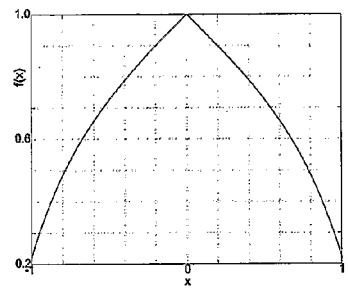

Using the weighting function $f$ illustrated in FIG. 9a, the influence of the internal forces is greatest at curvature values of zero (flat areas), and decreasing by negative and positive curvature values (curved areas).

A single external force is used to adjust the surface to the WM/GM boundary. This force (designated inflation) utilises the voxel based fuzzy memberships of the different tissue classes. The direction of the force is always in the positive or negative direction of the surface normal. The reasoning is, that if a vertex is positioned in WM, the inflation force must push the vertex outward (inflating), while if positioned in GM or CSF, the force must push the vertex inward (deflating), thus continuously pushing the vertex towards the WM/GM boundary. The tissue memberships are used to determine whether the vertex is in WM or GM/CSF. The memberships are also used to control the magnitude of the force. If a vertex is positioned far from the WM/GM boundary, it is likely that either the WM membership or (GM+CSF) membership is dominant. The force is therefore scaled by the difference between WM membership and (GM+CSF) membership, so vertices positioned on the WM/GM boundary as approximated by the segmentation are not affected by the inflation force. The membership values for each tissue class are in the interval [0:1], and sums to 1 across the classes at each voxel. The inflation force can therefore be expressed as:

$$p(i) = \Delta\mu(i)n(i), \qquad (7)$$

where $$\Delta\mu(i) = \mu_{WM}(i) - (\mu_{GM}(i) + \mu_{CSF}(i)),$$

where μ is the membership values and n(i) is the unit normal at vertex i. The surface normals at vertices are calculated by averaging the normals of the adjacent polygons. The membership values are interpolated in the voxel data when read at the vertex positions. Using the expression in (7), the magnitude of the inflation force is increasing linearly with the membership difference. However, to take the uncertainty of the fuzzy classification into account, there should be some degree of freedom when the membership difference is close to zero. A weighting function is therefore applied to the membership difference before it is multiplied with the unit normal:

$$\hat{p}(i) = c_5 g(\Delta\mu(i))n(i), \qquad (8)$$

where $c_5$ is a weighting constant and $$g(x) = x(2 - 2\cos(x)), x \in [-1;1] \qquad (9)$$

Figure 9B:
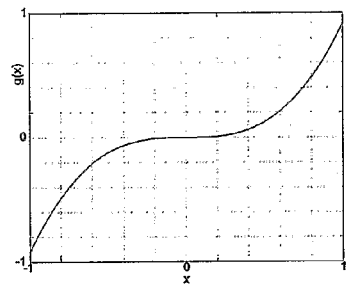
Figure 9C:
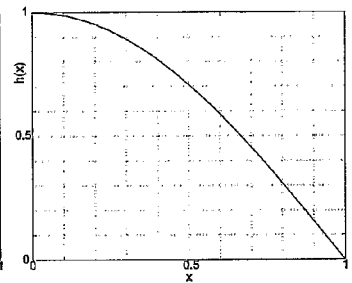

As can be seen from FIG. 9b, the weighting function g reduces the influence around zero and increases the influence more rapidly when the certainty of the vertex being in one of the tissues is high.

Using the inflation force as the only guide to detect the WM/GM boundary can be dangerous, as the force is solely dependent on the fuzzy tissue classifications. Since the target boundary is relatively well-defined in form of an image edge, information of the image gradient can be used. When a vertex is positioned on a strong WM/GM image gradient it should not be moved further. The magnitude of the update vector u is therefore reduced when the magnitude of the gradient increases. This is done by mapping the normalised gradient values with the function:

$$h(x) = \cos\left(\frac{\pi}{2}x\right), x \in [0;1] \qquad (10)$$

and scaling the update vector u by the result. As can be seen from the plot of formula (10) in FIG. 9c, the update vector u is unchanged when there is no gradient and greatly shortened when a strong gradient is present in the given vertex position. Using the gradient this way has the effect that the surface vertices "snap" to image edges. However, when working with MR data, there is bound to be noise in the data, which can perturb the gradient. Furthermore, the WM/GM edge is not the only image edge in the data. Therefore, information of the gradient must only be used when close to the target edge (WM/GM edge) and suppressed when far from the edge. The weighted membership difference g(Δμ(i)) in formula (8), FIG. 9b, that provides a certainty index for how close to the WM/GM boundary a vertex is positioned, is therefore utilised to weight the influence of the gradient. The resulting update vector is therefore given as:

$$u(i) = (1 - |g(\Delta\mu(i))|)\cos\left(\frac{\pi}{2}|\nabla(i)|\right)(\hat{u}_{int}(i) + \hat{p}(i)), \qquad (11)$$

where ∇(i) is the normalised image gradient at vertex i.

During surface deformation, the surface is remeshed at prespecified intervals. The remeshing is based on the vertex density of the surface. This is done to avoid clustering of vertices and allowing the surface to expand where necessary, i.e. the distribution of vertices is kept uniform throughout the surface. The surface remeshing algorithm is simple and does not change the topology of the surface. Edges in the surface which are longer than a threshold $T_{max}$ are split into two edges by placing a new vertex at the midpoint of the edge, which is illustrated in FIG. 10b. Similarly, edges in the surface which are shorter than a threshold $T_{min}$ are removed by collapsing the vertices that define the edge into a single vertex placed at the midpoint of the removed edge, which is illustrated in FIG. 10a. The latter operation has the potential of altering the topology of the surface. A check is therefore performed, whether it is possible to remove a given edge without altering the surface topology.

The surface is prevented from self-intersecting during deformation. The self-intersection test is made efficient by combining a fast triangle-triangle test by Tomas Möller, in "A fast triangle-triangle intersection test," *Journal of Graphics Tools*, vol. 2, pp. 25-30, 1997, with a spatial lookup-table, which reduces the number of actual intersection calculations to be made.

After the described steps, the inner surface has been generated and can in the following be used for deformation towards the outer boundary of the cortex. This process will be described in the following.

C. Outer Surface Deformation

Figures 11A, 11B, 11C:
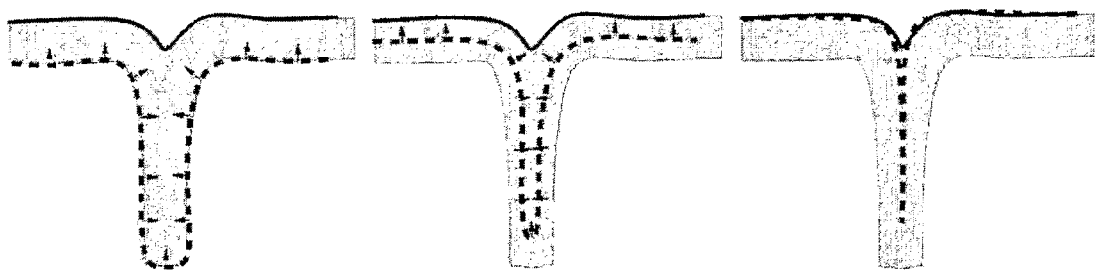

The outer boundary of the cerebral cortex is defined as the crossing from GM to CSF. It follows approximately the same convexities and concavities as the inner cortical boundary. Hence, the inner surface is a good initial estimate of the outer cortical boundary. The task of deforming this initial surface to conform to the outer boundary is made difficult by the fact, that the outer boundary is not well-defined anywhere on the cortical mantle. The limited resolution of MRI may cause CSF, placed between tight sulcal walls, to disappear in the MRI scan. When no CSF is evident between the sulcal walls of a sulcus, the best estimate of the boundary may simply be the medial axis of the sulcus. This position can be approximated by displacing the inner surface from an initial state, which is illustrated in FIG. 11a, in the direction of the surface normals, FIG. 11b, until the surface meets itself, FIG. 11c. Thereby sulci are modeled, even though only little or no image information for the sulci is available. Hence, an inflation force similar to the one used in the deformation of the inner surface can be used for modeling sulci. However, the membership difference is changed, so the inflation force drives the surface towards the CSF/GM boundary:

$$p(i)=\Delta\mu(i)n(i), \text{ where } \Delta\mu(i)=\mu_{CSF}(i)-(\mu_{GM}(i)+\mu_{WM}(i)) \quad (12)$$

The weighting function g(x) in (9) taking into account the fuzzy membership values is also applied to the inflation force, in order to lower its influence, when the surface is close to an image edge:

$$\hat{p}(i)=g(\Delta\mu(i))n(i) \quad (13)$$

Displacement forces governed solely or mainly by surface normals, approximated from a discrete mesh, may be misleading, as they can be perturbed by noise in the surface. This may erroneously cause modelling of non-existing features, when the surface is displaced over larger distances. A single misleading normal may for example cause modelling of a non-existent sulcus on the crown of a gyrus. As the cortex is thicker at the crowns of gyri than at the fundi of sulci, the problem is most evident at gyri. Increasing the influence of the internal forces resolves this problem, but also prevents the surface from reaching small convexities and concavities, which are truly evident in the MRI data.

Therefore, an optimum solution has to balance, on the one hand, those forces that tend to introduce sulci into the surface and, on the other hand, the forces that smooth out possible sulci. In order to accomplish this, appropriate vector fields may be introduced. One vector field that may be used among others is disclosed in Chenyang Xu and Jerry L. Prince, "Gradient vector flow: A new external force for snakes," in *IEEE Proc. Conf. on Comp. Vis. Patt. Recog.*, 1997. This Generalised Gradient Vector Flow (GGVF) field provides a force vector pointing towards image edges for every spatial location in a provided volumetric edge map. Any edge map, such as the one obtained by calculating the magnitude of the first order derivative of the original MRI data, can be used. However, the disadvantage of the method by Xu and Prince is that the vector field unfolds some sulci and does not find the correct depth for other sulci. The method by Xu and Prince may be satisfactory for finding the inner cortex surface but has severe shortcoming for the outer surface.

In contrast to the method disclosed by Xu and Prince as mentioned above, the preferred edge map for the method according to the invention is calculated as the magnitude of the first order derivative of the sum of the WM and GM fuzzy memberships. However, other algorithms may be used with the method according to the invention. Even a binary segmentation may be included in the method according to the invention. In order to reduce noise in the image, the original data may be subjected to a filter, for example an anisotropic filter, before the gradient is calculated.

This way, the only edge defined by the edge map is the edge between GM/CSF, and the GGVF field will point in the direction of this edge. The advantage of using the fuzzy membership for the gradient vector field is illustrated in FIG. 12, where FIG. 12a illustrates a gradient vector field using the first order derivative of original data and FIG. 12b is a gradient vector field calculated from the sum of GM+WM fuzzy memberships.

In the first case as illustrated in FIG. 12a, the gradient vector field contains field vectors pointing towards the WM/GM edge and towards the GM/CSF edge. The consequence is that the surface near the inner boundary of the cortex during the deformation does not approach the outer boundary, because the gradient vector field vectors in the neighbourhood of the inner boundary point towards this boundary—the WM/GM boundary—and pulls the deforming surface back towards the inner boundary during the iterative deformation process. In the second case, as illustrated in FIG. 12b, the gradient vector field is much more homogeneous pulling the deforming surface towards the outer boundary of the cortex—the GM/CSF boundary—during the iterative deformation. For the method according to the invention, a GGVF is applied. However, other gradient vector fields may be used as well as any other vector field that points towards an edge.

The GGVF force drives the surface directly into concavities and convexities, provided they are visible in the edge map, and thus avoids the problems associated with using the directions of the normal vectors. However, the GGVF force—when used alone—will cause tight sulci with no CSF evident to be unfolded, and thus performs best at the gyri, which in general have well-defined image edges. As a solution to this problem, the normal vector can be combined with the GGVF vector in order to also model sulci. The advantage is an improved modelling of both sulci and gyri.

As a further improvement, the local surface curvature, calculated in a geodesic neighbourhood (see eq. 1), is used for weighting the GGVF vector against the normal vector. The surface curvature has the largest values at the crown of gyri, and the lowest values at the fundi of sulci, if calculated over a proper geodesic neighbourhood. Thus, by including this weighting, the GGVF vector dominates the normal vector at the crown and ridges of gyri, and the normal vector dominates the GGVF vector along the fundi, and walls of sulci.

The surface curvature is used as a parameter in two simple weighting functions, which combines the normal and GGVF vectors:

$$u_{ext}(i) = c_6\left(\hat{p}(i)\frac{1-\rho(i)}{2} + G(i)\frac{1+\rho(i)}{2}\right), \quad (14)$$

where p̂(i) is the inflation force vector at vertex i, G(i) is the GGVF vector at vertex i, and $c_6$ is a weighting constant. Other local properties than the surface curvature may be used to weight the normal vector and the GGVF vector so the normal vector is dominating along the fundi and walls of sulci, and the GGVF vector is dominating at the crown and ridges of gyri. These include properties derived from image intensities, distance maps, atlas information, etc.

Internal forces, similar to those used in the deformation of the inner surface, are also used in the deformation of the outer surface. The only modification is the weights applied to the internal force vectors and the size of the geodesic neighbourhood, over which the local curvatures are calculated. It is noted that the used external forces are biased to the fuzzy memberships. In order to lower the influence of the fuzzy memberships in the final delineation of the outer boundary, an image gradient based scaling function, similar to the one used in the deformation of the inner surface, is applied to the sum of internal and external forces, resulting in the vector $$u(i) = (1 - g(\Delta\mu(i)))\cos\left(\frac{\pi}{2}\|\nabla(i)\|\right)(\hat{u}_{int}(i) + u_{ext}(i)), \quad (15)$$

where ∇(i) is the normalised image gradient at vertex i, and $\hat{u}_{int}(i)$ is the weighted sum of the internal forces similar to formula (5).

Finally, to increase the robustness of the deformation, every update vector u is scaled by a function, which makes the surface evolve at different speeds depending on the local surface curvature. The scaling causes the surface to evolve slower in sulci, than at gyri. This is useful, as the risk of surface self-intersections is higher in sulci than at gyri, and as the image edges in general are weaker in sulci, than at gyri. Applying the curvature dependent scaling function to u(i) results in the following formulation of the update vector û(i):

$$\hat{u}(i) = u(i)\frac{1.1 + \rho(i)}{2}, \quad (16)$$

The outer surface is prevented from self-intersecting during deformation using the same self-intersection test as on the inner surface deformation. As the surface area of the outer cortical boundary is larger than the surface area of the inner cortical boundary, the discrete surface is periodically remeshed during the deformation, using the same method as the one used during the deformation of the inner surface.

The deformation of the outer surface converges when the deforming surface is positioned on the second boundary and is sufficiently smooth. The influence of the image gradient is increased when the deforming surface is close to a classified outer boundary (i.e. when the differences between the fuzzy memberships are close to zero). The magnitude of the update vectors calculated for the deforming surface is decreased linearly in relation to the gradient magnitude. Hence, the magnitude of the update vectors becomes very small when both the image gradient and fuzzy segmentation strongly indicate that the surface has reached the second boundary. The update vector consists of both internal and external forces. The external forces push the surface towards the second boundary, but become small or diminish completely when the surface is very close to or exactly on the second boundary, and leave the internal forces as the only forces acting on the surface. The internal forces can, however, at this point only introduce very little smoothing as the magnitude of the update vector is very small and the deformation will soon converge.

Having the inner and outer boundaries of the cerebral cortex represented as two closed surfaces, it is possible to measure the cortical thickness, volume, area and curvature. Furthermore, the surface representing the inner cortical boundary enables the measuring of volume, area and curvature of the cerebrum WM.

Alternatives

In the following a number of alternative means for the method according to the invention are summarized.

In connection with the digital skull removal technique, one may use a Brain Extraction Tool as disclosed in S. Sandor and R. Leahy, "Surface-Based labeling of cortical anatomy using a deformable atlas", IEEE Transaction on Medical Imaging, vol. 16, no 1, pp 41-54, 1997. Alternatively, the Brain Surface Extractor may be applied as disclosed in S. M. Smith, "Fast robust automated brain extraction", Human Brain Mapping, vol. 17, no. 3, pp. 143-155, 2002.

The fuzzy c-means algorithm is used for segmenting the WM of the cerebrum in the creation of the initial surface. Alternatively, any segmentation algorithm capable of segmenting the WM of the cerebrum may be used. In the Bayesian approach by Geman S, Geman D: "Stochastic relaxation, Gibbs distribution and the Bayesian restoration of images." IEEE Trans Pattern Analysis and Machine Intelligence 1984; 6(6): 721-741, the MRI data is assumed to be a multivariate normal distribution. The mean and covariance parameters of the distribution are estimated from training data where the true segmentation is known. In the Expectation Maximisation algorithm by Wells III W M, Grimson W E L, Kikinis R, Jolesz F A: "Adaptive segmentation of MRI data." IEEE Trans Medical Imaging 1992; 15(4): 429-442, the Bayesian approach is combined with means for handling gain fields (intensity inhomogeneities due to inhomogeneities in the MR coil) and thus obtains a better segmentation. In "Model based three dimensional Medical Image Segmentation." PhD Thesis, Artificial Intelligence Laboratory, Massachusetts Institute of Technology, Cambridge, Mass., May 1999, Kapur describes an extension of the Expectation Maximisation algorithm referred to as "Markov Random Field-Based Technique" where Gibbs' model is added to the gain field. These three segmentation algorithms based on the Bayesian approach all requires a priori knowledge extracted from training data representative of the data to be segmented. Although the algorithms are fully automated their reliance on representative training data is a drawback. In "A comparison of neural networks and fuzzy clustering techniques in segmenting MRI of the brain.", IEEE Trans Neural Networks 1992; 3(5): 672-682, Hall L O and Bensaid A M describe an artificial neural network technique for segmenting brain images. The drawback of artificial neural networks is that they also require training data. Several clustering algorithms such as the K-nearest neighbour algorithm closely related to the fuzzy c-means algorithm exist. The clustering based algorithms are advantageous in the current context as they are typically fully automated and do not require training data. The fuzzy c-means algorithm is advantageous to the K-nearest neighbour algorithm as it assigns fuzzy memberships to the image voxels instead of crisp belongings and thereby maintains more image information.

The brain stem is removed in the creation of the initial surface in order to isolate the cerebrum. Several techniques may replace the currently used technique. As the brain stem is characteristic in appearance and shape, a voxel based template matching approach may be used for locating and removing the entire brain stem, or parts of it. This may be achieved by convolving the image data with a single/or several template(s) resembling the brain stem, and identifying the voxel positions providing the best match. For speed, the approach may be carried out in the frequency domain thus reducing the convolution of the two large image data matrices to a matrix multiplication. Alternatively, the brain stem may be delineated using an active shape model as the one disclosed by T. F. Cootes in "A mixture model for representing shape variation", Image and Vision Computing, No. 17, p. 567-573. The drawback of using an active shape model is that it requires representative training data. As a further alternative, the voxels in the MR data representing the brain stem may be located by fitting a deformable surface model to the boundaries of the brain stem. The deformable surface may initially be positioned using Talairach coordinates. The three described alternatives may replace the used simple masking technique, but they require additional computational resources and introduce no additional benefit.

The pipeline for creating the initial surface applies iterative median filtering to the WM membership volume after the brain stem have been masked out in order to isolate the cerebrum. Other filtering techniques may be used as well, provided that they remove tiny connections in the WM between the cerebrum, remaining parts of the brain stem and the cerebellum. This may be achieved by mathematical morphological erosion of the WM volume in conjunction with a membership threshold. As another alternative the small connections may be removed by a connectivity analysis approach, which locates and removes voxels connecting large groups of voxels. This may be achieved by performing slice by slice 2D foreground/background labeling of the WM volume and then analysing voxels connecting labels in consecutive slices.

Conditional Topological Expansion is used posterior to the filtering of the WM in order to regain lost information. This step may be omitted at the cost of slightly poorer initial inner surface.

The topology correction algorithm used in the developed method may be replaced by other topology correction algorithms such as the one described by D. W. Shattuck and R. M. Leahy in "Automated graph-based analysis and correction of cortical volume topology," IEEE Transactions on Medical Imaging, vol. 20, no. 11, pp. 1167-1177, 2001. This method operates on volumetric data and corrects the topology of a binary object. The method, however, only performs corrections along the Cartesian axes, and the corrections to the volume may therefore appear unnatural and unnecessary large. Furthermore, the method is restricted to either making foreground or background correaction. Alternatively, a method operating directly on a surface can be used. Such a method is described by B. Fischl, A. Liu and A. M. Dale in "Automated manifold surgery: constructing geometrically accurate and topologically correct models of the human cerebral cortex", IEEE Transactions on Medical Imaging, Vol. 20 issue 1, pp. 70-80, 2001. The method proposes to locate and correct topological defects in a surface, by inflating the surface to a sphere and locating regions where the surface overlaps itself. Unfortunately it is not guaranteed to work in all cases. Secondly, it may remove larger parts of the surface than strictly necessary during the correction procedure.

The Marching Cubes algorithm [William E. Lorensen and Harvey E. Cline, "Marching cubes: A high resolution 3D surface construction algorithm," Computer Graphics, vol. 21, no. 4, pp. 163-169, 1987, and U.S. Pat. No. 4,710,876 and U.S. Pat. No. 4,885,688] is used for creating an explicit surface representation of the topology corrected object in the WM volume. Any algorithm capable of extracting a simple closed surface, represented as a discrete triangular polygonal mesh, may replace the Marching cubes algorithm. A close relative to the Marching Cubes algorithm is disclosed by B. P. Carneiro, C. T. Silvia, and A. E. Kaufman in "Tetra-cubes: An algorithm to generate isosurfaces based upon tetrahedra" Anais do IX SIBGRAPI pp. 205-210, 1996. The Marching cubes algorithm is preferred to the Tetra-cubes algorithm as it requires fewer polygons for representing the same object.

In order to reduce the presence of local extremities in the extracted surface, a curvature dependent pruning is made of the binary object prior to surface tessellation. This step may be replaced by other means for reducing local extremities in the surface or may be omitted at the cost of a slightly poorer initial inner surface.

The surface remeshing used during deformation may be omitted. However, to obtain best results, surface remeshing is recommended. Alternatives to the described surface remeshing method can be used. It is important that the deployed remeshing method is automatic, does not alter the topology of the surface, avoids self-intersections, and ensures regularly spaced vertices on the surface. Some alternatives are:

Remeshing similar to the one described, but dependent on one or more of the following parameters: edge length, face area, surface curvature, vertex density.

A method that generates a completely new surface resembling the existing surface, but with uniformly distributed vertices as described in "Retiling polygonal surface" by Greg Turk, Computer Graphics, vol. 26, pp. 55-64, July 1992. This method has the drawback of being computational heavy compared to the one described.

Pierre Alliez, David Cohen-Steiner, Olivier Devillers, Bruno Lévy, and Mathieu Desbrun: "Anisotropic Polygonal Remeshing", ACM Transactions on Graphics, vol. 22, Issue 3, pp. 485-493, July 2003

Pierre Alliez, Éric Colin de Verdiére, Olivier Devillers, and Martin Isenburg: "Isotropic Surface Remeshing", Proceedings of the Shape Modeling International 2003, p. 49, ISBN: 0-7695-1909-1

None of the mentioned alternatives guarantees that self-intersections in the surface do not occur as a result of the remeshing similar to the one described.

In connection with the surface self-intersection avoidance method, alternatives may be used. Any algorithm capable of detecting self-intersections in a surface may be used. The most important alternatives are:

Brute force triangle-triangle intersection test over the entire surface. This is extremely computational demanding.

Triangle-triangle intersection test in a geodesic neighbourhood of the surface. Since the surface may self-intersect because of deep folds in the surface, the two parts of the surface intersecting may be very far apart measured in geodesic distance. This means that the geodesic neighbourhood, for which the intersection tests are done, must be of a size, which makes this method more computational demanding than the one described.

Bounding boxes instead of triangle intersection tests may be used. When dealing with surfaces where the details are very important, this method is not preferable, as the amount of bounding boxes applied must be in the order of the amount of triangles of the surface. This in turn give rise to computational drawbacks. Fewer bounding boxes may be used to lower the computational demands. This, however, prevents the surface from forming tight folds, where the opposite banks are fully collapsed.

Alternatives to the used deformation method are any deformation method that acts on a discrete mesh and is able to incorporate the described forces/energies. A specific alternative to move the vertices of the surface in the direction of the summed forces is to deform the surface using minimization of an energy function. Using this approach, the same forces as described can be used in an energy function, though the function in this case must be expressed as a sum of energies for each vertex position and not a sum of force vectors. Methods to deform the surface based on energy minimization include:

Gradient descent evaluates the first derivative of the energy function, and displaces the vertices in the negative direction until a gradient of zero is reached. Using this method may result in the deformation stops at local minima of the energy function. This minimization method is described in W. H. Press, S. A. Teukolsky, W. T. Vetterling, and B. P. Flannery, "Numerical Recipes in C", The Art of Scientific Computing, Cambridge University Press, 1992

Conjugate gradients is similar to the gradient descent method, but solves some of the drawbacks attached to it. Still, this method does not guarantee to find the global minimum of the energy function. This method is used by D. MacDonald in "*A Method for Identifying Geometrically Simple Surfaces from Three Dimensional Images*", PhD thesis, McGill University, Montreal, 1997.

The greedy algorithm is a very fast and efficient minimization method, but displaces, like the gradient descent method, the vertices to the nearest minima, thus not ensuring convergence to the global minimum. The greedy algorithm is described in D. J. Williams and M. Shah, "A fast algorithm for active contours," in *Third International Conference on Computer Vision*, 1990.

Dynamic programming ensures to find the global minimum of the energy function, but this method is extremely computational demanding, with a complexity of $O(n^3)$. This method is described in A. A. Amini, T. E. Weymouth, and R. C. Jain, "Using dynamic programming for solving variational problems in vision," *IEEE Transactions on Pattern Analysis and Machine Intelligence*, vol. 12, no. 9, pp. 855-866, 1990.

Simulated annealing uses a stochastic process to change the configuration of the curve/surface. A variable called "temperature" is used to control the stochastic process. In each iteration, the configuration of the curve/surface is either accepted or rejected, and the temperature is modified accordingly. If the configuration is accepted the temperature may be lowered, and if the configuration is rejected the temperature may be increased. This enables the curve/surface to get out of local minima. This method is able to ensure that the global minimum of the energy function is found. However, the completion time of the algorithm cannot be determined, and the scheduling of the temperature is difficult in fully automatic systems. Simulated annealing is described in R. P. Grzeszczuk and D. N. Levin, ""brownian strings": Segmenting images with stochastically deformable contours," *IEEE Transactions on Pattern Analysis and Machine Intelligence*, vol. 19, no. 10, pp. 1100-1114, 1997.

Finite difference method solves a discrete formulation of the Euler equations for the energy function of the curve/surface using a numerical method. The solution is searched for in a stepwise manner, which means that the size of the steps is essential for the result. If a too small step size is used, the search may stop in a local minima, and if the step size is too large, a satisfying solution may never be found. The finite difference method is used by M. Kass, A. Witkin, and D. Terzopoulos in "Snakes: Active contour models," *International Journal of Computer Vision*, 1988.

Finite element method is similar to the finite difference method. The difference is in how the curve/surface is converted to a discrete form. In finite element method, the curve/surface is represented by a sum of polynomial functions, each representing a segment between two nodes. A system of linear equations can be formulated and solved in the same way as in the finite difference method. The finite element method is described in L. D. Cohen and I. Cohen, "Finite-element methods for active contour models and balloons for 2D and 3D images," *IEEE Transactions on Pattern Analysis and Machine Intelligence*, 1993.

Deforming the curve/surface by minimizing the energy function may lead to results similar to the results obtained by the described method.

The internal forces, which must ensure smooth characteristics of the curve/surface, are chosen in their simplest form (the umbrella operator), as the "only" need is smoothing forces dependent on the intrinsic properties of the curve/surface, and as the periodical re-meshing lowers the negative side effects of the umbrella operator. The negative side effects of the used internal forces are that the general shape of the curve/surface is altered during the smoothing due to shrinkage. Alternatives to the internal forces address this issue, but they are all more computational demanding. Examples are:

The Taubin method smoothes the curve/surface by acting like a low-pass filter, thus removing high curvature variations without shrinkage. This method shows good results, but is difficult to adjust to the specific application, as the determination of the low-pass filter parameters prove almost impossible. The method is described by Gabriel Taubin, "Curve and Surface Smoothing Without Shrinkage", in Proceedings of IEEE International Conference on Computer Vision, pp. 852-857, 1995

Scale dependent Laplacian scales the umbrella operator with the length of the surrounding edges. This method partly solves the shrinkage problem, however, vertices still slides in flat areas. The method is described in Mathieu Desbrun, Mark Meyer, Peter Schroder, and Alan H. Barr, "Implicit fairing of irregular meshes using diffusion and curvature flow", Proceedings of the 1999 Annual Conference—SIGGRAPH 99, pp. 317-324, 1999

Mean Curvature Flow moves every vertex in the normal direction with speed equal to a discrete approximation of the mean curvature at the vertex. The drawback of this method is that it produces unevenly distributed vertices. A description of the method can be found in Mathieu Desbrun, Mark Meyer, Peter Schroder, and Alan H. Barr, "Implicit fairing of irregular meshes using diffusion and curvature flow", Proceedings of the 1999 Annual Conference—SIGGRAPH 99, pp. 317-324, 1999

Yutaka Ohtake, Alexander G. Belyaev, and Ilia A. Bogaevski describe a method in "Polyhedral surface smoothing with simultaneous mesh regularization", Proceedings Geometric Modeling and Processing 2000. Theory and Applications, pp. 229-237, 2000, where they combine the Laplacian flow with the mean curvature flow. Their method produces meshes with regular distributed vertices while preserving the initial shape. This method is, however, more computational demanding than the other methods mentioned.

The inflation force vectors are found by scaling the curve/surface normals by a difference of fuzzy memberships. The described inflation force for the deformation of the outer curve/surface may be replaced by an alternative inflation force, provided that it displaces the curve/surface in a direction approximately normal to the curve/surface if placed in the first or second object and in a direction approximately inversely normal to the curve/surface when placed in the third object. Similarly, the described inflation force for the deformation of the inner curve/surface may be replaced by an alternative inflation force, provided that it displaces the curve/surface in a direction approximately normal to the curve/surface if placed in the first object and in a direction approximately inversely normal to the curve/surface when placed in the second or third object. Several alternative inflation forces, fulfilling these requirements may be defined by replacing the fuzzy-membership scaling function with an alternative function such as: a) A function based on the original MRI data determining the direction of the vectors approximately normal to the curve/surface using a simple image intensity threshold. Such a force is disclosed by T. McInerney and D. Terzopoulos in "Topology adaptive deformable surfaces for medical image volume segmentation," IEEE Transactions on Medical Imaging, vol. 18, no. 10, pp. 840-850, 1999. Terzopaulos et al. defines a binary function which switches between the positive and negative direction of the curve/surface normals if the image intensity is above or below a certain threshold. The binary switch may cause the contour to oscillate, jumping forth and back across an image edge. The magnitude scaling based on the fuzzy memberships used in the proposed method reduces the risk of oscillation across image edges. b) a function determining the direction of inflation based on a classification of the image data using a image classifier and the curve/surface normals, i.e. replacing the fuzzy memberships with output from a different classifier. c) The inflation force may solely consist of the directions of the curve/surface normals with no directional or magnitude scaling. This only works if the curve/surface is completely contained within the first object, and may be dangerous if the contour is not stopped when on the desired image edge.

The GGVF vector field used in the deformation of the outer surface may be replaced by any other vector field containing vectors pointing towards the second boundary. Such vector fields include: The Gaussian Potential force by M. Kass, A. Witkin, and D. Terzopoulos in "Snakes: Active contour models," International Journal of Computer Vision, 1988, where a gradient image is blurred with a Gaussian kernel and partial derivatives of the blurred image comprises the vector field. The Gaussian potential force is limited by a small attraction range and its definition of the image edges is blurred. Although a multi-scale implementation may reduce these deficiencies the Gaussian potential force is still inferior to the GGVF field. The Distance potential force by L. D. Cohen and I. Cohen in "Finite-element methods for active contour models and balloons for 2D and 3D images," IEEE Transactions on Pattern Analysis and Machine Intelligence, 1993 comprises a potential vector force field calculated from a map of distances to the nearest image edge. The vectors comprising the Distance potential force field points towards the nearest image edge points. This is in general a desirable feature, but may make it difficult for the surface to proceed into narrow concavities. The "nearest boundary" distance force by D. MacDonald, N. Kabani, D. Avis, and A. C. Evans in "Automated 3-D extraction of inner and outer surfaces of cerebral cortex from mri," NeuroImage, vol. 12, pp. 340-356, 2000 searches in the positive and negative directions of the surface normal for the nearest image edge. The direction of vectors in "nearest boundary" force is limited to the direction of the surface normal. While the force may be extended to search along other directions it is very computationally demanding and therefore inferior to the GGVF force.

Information of image edges is in the described method found by taking the magnitude of the first derivative of the original MRI data or of the sum of the fuzzy WM and GM memberships. Several other means may be utilized for defining image edges, including: a) Calculating the magnitude of the second order derivative of the original MRI data. b) Using the Marr-Hildreth edge detector disclosed by E. C. Hildreth in "Edge detection for computer vision system", Mechanical Engineering, Vol. 104 Issue. 8, 48-53, 1982. c) Using the Deriche edge detector disclosed by Rachid Deriche in "Fast Algorithms for Low-Level Vision", IEEE Transactions on Pattern Analysis and Machine Intelligence, vol. 12, No. 1, January 1990. d) Using the Canny edge detector disclosed by J. Canny in "A computational approach to edge detection", IEEE Transactions on Pattern Analysis and Machine Intelligence, Vol. PAMI-8 Issue. 6, pp. 679-98, 1986. The first order derivative is preferred to the alternatives at it maintains image information and is fast to compute.

The curve/surface normals as used in for example the inflation force may be approximated differently. The direction of the normal at a vertex may be defined as a weighted average of the normals of the adjacent polygons weighted by the area of each polygon or weighted by the length of the adjacent line segments. Alternatively, the direction of the normal in a vertex may be defined as the direction of the normal to the largest adjacent polygon.

Special Cases

In cases where the cortical regions are malformed by a tumour, large aneurisms or other abnormalities, the method may still delineate the correct boundaries of the cortex as the method does not impose any minimum or maximum distance between inner and outer curve/surface. The result depends on the nature of the abnormality. If a tumour is present near the cortical mantle, it may be classified as either WM or GM or partly both, because the method does not take a fourth tissue type into account. If the tumour is attached to the WM and it is classified as WM, the method has no problem detecting the correct cortical boundaries. Likewise, if the tumour is attached to the GM and it is classified as GM, no problems arise. In such cases, the cortex is abnormally thick in the region where the tumour is placed, which may aid in pinpointing the location of the tumour. Another scenario where the method is successful is when the tumour is completely surrounded by WM. In this case it does not matter whether the tumour tissue is classified as GM or WM as the method fills "classification holes" within the WM. Problems may, however, arise in cases where the tumour is completely contained in the GM and the tumour tissue is classified as WM. In such cases, the method may underestimate the cortical thickness, as the cortex has more than two boundaries in the area of the tumour. However, the method will most likely delineate the outermost boundary of the GM, as the inflation force keeps pushing the curve/surface outwards until evidence of CSF is detected in the fuzzy memberships. This in turn leads to the same result as if the tumour is classified as GM, thus the cortex is found abnormally thick enabling the pinpointing of the tumour. The last scenario is when the tumour is split into two tissue classes by the classifier and is present between the WM and GM. In this case, the delineation of the cortical boundaries is most likely erroneous.

In cases where aneurisms has malformed the cortical region, the behaviour may be the same as for tumours. However, aneurisms appear bright in T1-weighted MR data and may therefore be classified as WM. This may give rise to problems with the delineation if aneurisms are completely contained in GM.

In general the results are dependent on the classification of the tissue of the abnormality present in the cortical region. A worst case scenario is if the tissue is classified as CSF. In this case the method may only be successful if the abnormality is present at the exterior side of the GM (outside second boundary). This scenario is, however, not considered likely as the most common abnormalities do not resemble CSF in T1-weighted MR data.

Applications

In-vivo measurements of cortical thickness, volume, area and curvature are of great interest in neurological examinations and studies of the human cerebral cortex, as they can be used to quantify change over time and/or differences between different populations. The measurements can easily be calculated on the basis of the discrete surfaces extracted using the described method, and may benefit research in cerebral atrophy and brain development in infants and children. FIGS. 13 and 14 provides illustrations of inner and outer surfaces of the cerebral cortex and FIG. 15 shows an example of cortical thickness measurement made on the basis of these surfaces. The surfaces can in conjunction with functional scans (PET, SPECT) and/or EEG provide very accurate localization of cortical activity, aiding numerous fields of neurological research concerned with both healthy and non-healthy brains. As a further application in the field of medical sciences, the surfaces may aid planning of surgical procedures, and may be used as a part of a surgical training system. The accuracy of the measurements done by the developed method has not been clinically validated yet, but measurements conducted on normal subjects prove to be in accordance with measurements printed in medical literature. Furthermore, preliminary results of measurements conducted on a population of demented elderly subjects indicate differences to a population of normal subjects. An example of cortical thickness of a healthy (lower figure) and demented subject (upper figure) is depicted in FIG. 16.

The invention claimed is:

1. Method for digitally processing n-dimensional images, where n>1, in the form of a digital data array, the image containing a first object, a second object and a third object where the second object is sheet like and has a first boundary with the first object along a first side of the second object and a second boundary with the third object along a second side of the second object, the three objects being at least faintly distinguishable in the image represented by the digital data array, the method comprising providing a digital dataset representing a deformable curve or surface that in an initial state is contained in the first or the second object, providing a vector force field that for points on the deformable curve or surface constitutes a direction from the point approximately towards to the second boundary, applying the vector force field on the digital dataset for iteratively deforming the deformable curve, characterised in that the vector force field comprises a normal vector field with local vectors normal or approximately normal to the deformable curve or surface, and that the iterative deformation of the deformable curve is performed in the direction of the vector force field and convergent towards the second boundary.

2. A method according to claim 1, wherein the normal vector field is weighted by a weighting function that is different from zero, for example identical to 1, for a majority of points in the second object.

3. A method according to claim 1, wherein the vector force field comprises a linear combination of a weighted normal vector field and at least one other weighted vector field, each of the other vector fields being independent of the normal vector field.

4. A method according to claim 1, wherein the second object is a folded structure with convexities and concavities and wherein the weighting function is dependent on whether the position of the points is in the concavities or in the convexities.

5. A method according to claim 1, wherein the second object is grey matter of a brain with sulci, wherein the weighting function of the normal vector field is configured to be dependent on the position in the sulci.

6. A method according to claim 1, wherein the vector force field also comprises a gradient vector field.

7. A method according to claim 6, wherein the method comprises calculating a local curvature of the deformable curve or surface in a geodesic neighbourhood of a point on the curve or surface and in dependency of the local curvature weighting the gradient vector field against the normal vector field in the vector force field at the point.

8. A method according to claim 1, wherein the deformable curve in an initial state approximates the first boundary.

9. A method according to claim 1, wherein the method comprises a fuzzy or probabilistic segmentation algorithm for weighted segmentation of the data in the digital data array into at least two classes, wherein one class is associated with the third object and the second class is associated with the second object, wherein the method further comprises basing the gradient vector field on a fuzzy membership or on a probabilistic value of the data in the digital data array.

10. A method according to claim 1, wherein the method comprises providing constraints for the deformation of the curve or surface, the constraints being configured for preventing self intersection.

11. A method according to claim 10, wherein the method implies a representation of the surface as a triangular mesh and the constraints imply a brute force triangle-triangle intersection test over the entire surface.

12. A method according to claim 10, wherein the method implies a representation of the surface as a triangular mesh and the constraints imply a triangle-triangle intersection test in a geodesic neighbourhood of the surface.

13. A method according to claim 10, wherein the method implies a representation of the surface using Bounding boxes.

14. A method according to claim 1, wherein the method comprises providing a step size for the iterative deformation of the curve, where the step size is calculated as the length of a vector of the vector force field scaled by a dynamic factor depending on the distance to an approximated second boundary.

15. A method according to claim 1, wherein the method comprises performing non-topology-altering remeshing of the deformable curve or surface in connection with the deformation.

16. A method according to claim 1, wherein the curve or surface in the initial state is provided by providing the deformable curve or surface in a pre-initial state, providing a pre-initial vector force field comprising a normal vector field, and applying the pre-initial vector force field on the digital dataset for iteratively deforming the deformable curve from a pre-initial state convergently towards the first boundary.

17. A method according to claim 16, where the curve or surface in the pre-initial state has the same Euler characteristic as assumed for the second boundary.

18. A method according to claim 1, wherein the method comprises identifying a fourth object in the image on the opposite side of the third object relative to the second object, providing a curve or surface contained in the third object and digitally removing the fourth object from the digital data set.

19. The method according to claim 1, for reconstruction of the boundaries of the cortex as a second object between the cerebrum WM as a first object and the cerebrospinal fluid as a third object in digital images of a brain.

* * * * *